US011003732B2

(12) United States Patent
Tseng

(10) Patent No.: US 11,003,732 B2
(45) Date of Patent: May 11, 2021

(54) METHODS AND SYSTEMS FOR PROTECTING USER-GENERATED DATA IN COMPUTER NETWORK TRAFFIC

(71) Applicant: Diluvian LLC, Burlington, MA (US)

(72) Inventor: Gregory Bricin Tseng, Burlington, MA (US)

(73) Assignee: Diluvian LLC, Burlington, MA (US)

( * ) Notice: Subject to any disclaimer, the term of this patent is extended or adjusted under 35 U.S.C. 154(b) by 409 days.

(21) Appl. No.: 16/013,222

(22) Filed: Jun. 20, 2018

(65) Prior Publication Data

US 2019/0005142 A1    Jan. 3, 2019

Related U.S. Application Data

(60) Provisional application No. 62/527,032, filed on Jun. 30, 2017.

(51) Int. Cl.
*H04L 29/08* (2006.01)
*G06F 16/954* (2019.01)
*G06F 16/9535* (2019.01)

(52) U.S. Cl.
CPC ........ *G06F 16/954* (2019.01); *G06F 16/9535* (2019.01); *H04L 67/02* (2013.01); *G06F 2216/15* (2013.01)

(58) Field of Classification Search
None
See application file for complete search history.

(56) References Cited

U.S. PATENT DOCUMENTS 6,286,104 B1 * 9/2001 Buhle ................... H04L 63/105
707/999.009
6,757,691 B1    6/2004 Welsh
(Continued)

FOREIGN PATENT DOCUMENTS

WO    2019005555 A1    1/2019

OTHER PUBLICATIONS

International Search Report & Written Opinion dated Sep. 28, 2018 in PCT application No. PCT/US2018/038483, 10 pages.
(Continued)

*Primary Examiner* — Angela Nguyen
(74) *Attorney, Agent, or Firm* — Blueshift IP LLC; Cynthia M. Gilbert

(57) ABSTRACT

A method for synchronizing, in a browser state of a web browser application, both automatically-generated content and user-generated content includes retrieving, by a controller application executing on a first computing device, from a profile database, profile content. The method includes receiving, by a first browser application, from the controller application, a first request including automatically-generated content based on the retrieved profile content. The method includes transmitting, by the first browser application, a first network request, the network request including the automatically-generated content. The method includes synchronizing, by a second browser application, a browser state of the second browser application with a browser state of the first browser application. The method includes receiving, by the second browser application, a second request including user-generated content. The method includes transmitting, by the second browser application, a second network request including the user-generated content and data from the synchronized browser state.

10 Claims, 13 Drawing Sheets

(56) References Cited

U.S. PATENT DOCUMENTS

| | | |
|---|---|---|
| 9,213,776 B1 | 12/2015 | Ledet |
| 2007/0157304 A1 | 7/2007 | Logan |
| 2008/0201401 A1* | 8/2008 | Pugh ................. H04L 29/12349 709/201 |
| 2011/0078333 A1 | 3/2011 | Jakubowski |
| 2014/0223488 A1 | 8/2014 | Korst |
| 2016/0170778 A1 | 6/2016 | Kalyanpur |
| 2018/0176319 A1* | 6/2018 | Herlitz ................... G06F 40/14 |

OTHER PUBLICATIONS

Extended European Search Report, dated Nov. 2, 2020, in European patent application No. 18822696.3, 11 pages.

Hannes Federrath et al., "Privacy-Preserving DNS: Analysis of Broadcast, Range Queries and Mix-Based Protection Methods," Advances in Databases and Information Systems [Lecture Notes in Computer Science; Lect.Notes Computer], Springer International Publishing, Cham, pp. 665-683, XP047509372, ISBN: 978-3-319-10403-4.

* cited by examiner

METHODS AND SYSTEMS FOR PROTECTING USER-GENERATED DATA IN COMPUTER NETWORK TRAFFIC

CROSS-REFERENCE TO RELATED APPLICATIONS

This application claims priority from U.S. Provisional Patent Application No. 62/527,032, filed on Jun. 30, 2017, entitled "Methods and Systems for Protecting User-Generated Data in Computer Network Traffic," which is hereby incorporated by reference.

BACKGROUND

The disclosure relates to protecting computer network traffic data. More particularly, the methods and systems described herein relate to functionality for protecting user-generated data in computer network traffic from analysis.

Digital privacy is an issue for both individual consumers and enterprises. For individual consumers, companies often profile them based on their personal data for a variety of purposes. Additionally, some individuals believe strongly in a right to privacy and do not want companies tracking them. Enterprises often find it necessary to protect business strategy and intellectual property from competitors; privacy threats can severely undermine these efforts.

There are a number of privacy threats faced by an internet user, whether the user is acting as an individual or on behalf of or as part of an enterprise. Typically, in order to reach a site by its domain, a web client will transmit a Domain Name Server (DNS) to a public DNS server. This query is typically in plaintext. As such, the exact domains being visited, and the timing of the visits, by the web client, are known to the Internet Service Provider (ISP). Recent rollbacks in regulation allow ISPs to share this type of customer data. Furthermore, DNS Servers are often operated by ISPs or other entities that may have interest in collecting or selling data. Much like the ISP, these entities are able to collect what domains are being visited and at what times by a client. If no DNS lookup is necessary, or if it has already been completed, the client will access resources through the use of an Internet Protocol (IP) address. Such access typically features encryption. However, the IP address of the service being accessed must be in plaintext in order for it to be routed, which allows the ISP to determine what services are being access, and at what times; this information may be shared without consent of the user.

Conventional solutions include attempts to disguise a user location and device by, for example, routing all traffic through a VPN or proxy. While this is successful to some extent in protecting the user's Internet Protocol (IP) address (and hence, physical location), it typically has no effect on the browser state (cookies, web-storage, session-storage, etc.) so analytics scripts, tracking beacons, and other tracking measures still represent a threat to privacy despite the proxy or VPN. VPNs and proxies also fail if the ISP is collecting data as the ISP can see both the tunnel to the VPN/Proxy server and the outgoing traffic from the server and the IP address must be in plaintext in order for the traffic to be routed to the destination machine, revealing the existence of the VPN/Proxy server itself and the tunnels connecting to it to the ISP.

Thus, there is a need for improved protection against such privacy threats.

BRIEF SUMMARY

A method for synchronizing, in a browser state of a web browser application, automatically-generated content and user-generated content to statistically poison analytics of computer network traffic including data associated with the synchronized browser state includes retrieving, by a controller application executing on a first computing device, from a profile database, profile content. The method includes receiving, by a first browser application executing on the first computing device, from the controller application, a first request including automatically-generated content based on the retrieved profile content. The method includes transmitting, by the first browser application, a first network request, the network request including the automatically-generated content. The method includes synchronizing, by a second browser application executing on the first computing device, a browser state of the second browser application with a browser state of the first browser application. The method includes receiving, by the second browser application, a second request including user-generated content. The method includes transmitting, by the first browser application, a second network request including the user-generated content and data from the synchronized browser state.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Figure 1A:
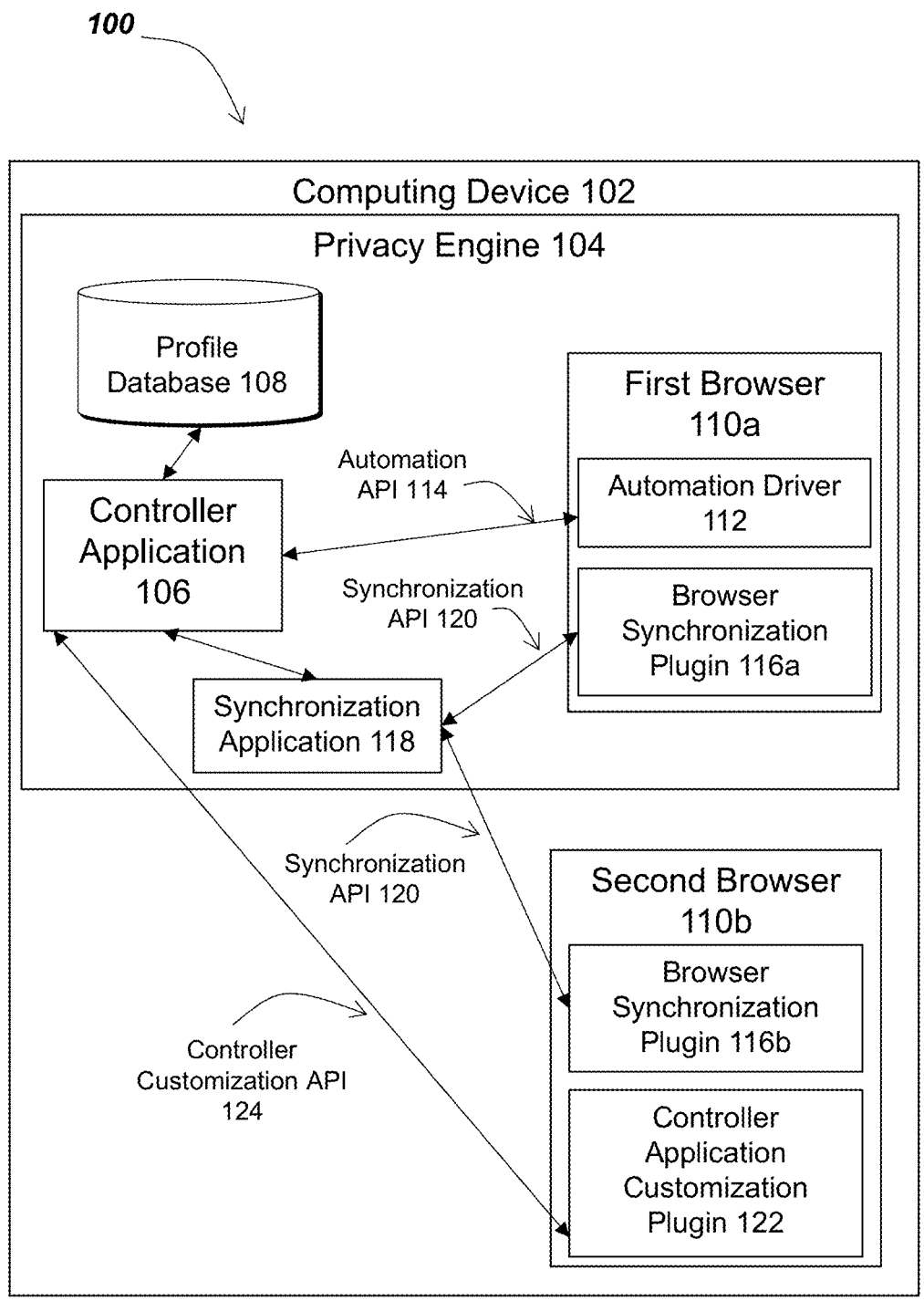
FIG. 1A is a block diagram depicting an embodiment of a system for synchronizing, in a browser state of a web browser application, automatically-generated content and user-generated content state.

Rather than attempt to block all privacy threats, the methods and systems described herein make analytics of the traffic infeasible, if not impossible, by, injecting into the computer network traffic, computer network traffic including both user-generated content and automatically-generated content. In some embodiments, the methods and systems described herein provide functionality that produces human-looking browser traffic that fools even highly sophisticated bot-detection systems. In one of these embodiments, a privacy engine is configurable to produce traffic characteristic of different interests, lifestyles, occupations, etc., and this noise will confound any attempts to track an entity protected by the privacy engine. The privacy stems from the difficulty of the task of determining which traffic is authentic traffic originating from the entity and which traffic is noise produced by the privacy engine.

In some embodiments, the methods and systems described herein provide functionality for creating computer network traffic including automatically-generated content and for generating browser state data associated with the computer network traffic including automatically-generated content. In one of these embodiments, the methods and systems described herein provide functionality for combining the generated browser state data with browser state data generated in connection with user-generated content; in this way, the combined browser state data makes it infeasible to determine what data is associated with a user and what was automatically-generated ("noise"), confounding attempts to analyze user-generated content. As will be understood by one of ordinary skill in the art, browser state data includes, without limitation, cookies, web-storage data, session-storage data, indexeddb storage, window size, display size and color depth, user agent, platform, language preference, ADOBE FLASH cache, and time zone.

In other embodiments, the methods and systems described herein provide functionality for generating additional computer network traffic including automatically-generated data. In one of these embodiments, the combination of automatically-generated data and user-generated data in the set of computer network traffic data transmitted from a user machine to one or more networked machines confounds attempts to identify and analyze what data is related to a particular user. In another of these embodiments, the methods and systems described herein provide functionality for performs spurious DNS lookups; thus, as above, an ISP or DNS server would be unable to determine which traffic is simply noise and which traffic contains genuine user requests for DNS lookups. This "smokescreens" the user's DNS lookups, providing the user with more privacy. Furthermore, this may impact a monetary value of analytics data and may even render attempts at analytics or sale of the data for analysis futile, which would disincentivize the collection of the data.

In some embodiments, the methods and systems described herein provide functionality for controlling a web browser in a manner similar to the manner in which a human user might control a web browser. In one of these embodiments, however, the methods and systems described herein provide functionality for retrieving and using profile data to automatically generate content for use in a network request, the content associated with the retrieved profile data instead of with a profile of the user.

In accordance with some embodiments, therefore the methods and systems described herein provide functionality for leveraging "statistical poisoning", or the production of inaccurate but realistic looking data that cannot be cleaned from a data set. Without a clean and accurate data set, any analytics of, and conclusions drawn from the data are likely inaccurate, rendering threats posed by the data or its collection moot.

In some embodiments, the methods and systems described herein can be deployed in many numerous ways, depending on the nature of the entity that needs its protection. These range from a software deployment running locally on a user machine to server and data center deployments or deployments in a "Privacy as a Service" type model. In each deployment, the privacy engine remains the same while the number of engines running and how they are accessed differs.

Referring now to FIG. 1A, a block diagram depicts one embodiment of a system for protecting user-generated data in computer network traffic. In brief overview, the system 100 includes a computing device 102, a privacy engine 104, a controller application 106, a profile database 108, a first browser 110a, an automation driver 112, an automation Application Programming Interface (API) 114, a browser synchronization plugin 116a, a second browser 110b, a browser synchronization plugin 116b, a synchronization application 118, a synchronization API 120, a controller application customization plugin 122, and a controller customization API 124. The computing device 102 may be any type or form of computing device (as described in greater detail below in connection with FIGS. 3A-C) that has been modified to execute instructions for providing the functionality described herein, resulting in a new type of computing device that provides a technical solution to a problem rooted in computer network technology.

This type of deployment provides users with an easy-to-use privacy solution. Such a deployment may be advantageous if the machine will be taken on many different LANs (such as a laptop being taken to coffee shops). It is also viable for a small business with limited infrastructure and a relatively small number of workstations.

Referring now to FIG. 1A, and in greater detail, the system 100 includes a privacy engine 104. In some embodiments, the privacy engine 104 is a software program. In other embodiments, the privacy engine 104 is a hardware module. In still other embodiments, the privacy engine 104 executes on the computing device 102, which may be a machine 100 as described below in connection with FIGS. 3A-C. In one embodiment, the privacy engine 104 executes the controller application 106, the synchronization application 118, and the first browser 110a.

In some embodiments, the controller application 106 is a software program. In other embodiments, the controller application 106 is a hardware module. In some embodiments, the controller application 106 is in communication with the privacy engine 104. In other embodiments, the privacy engine 104 provides the functionality of the controller application 106. In one embodiment, the controller application 106 accesses an automation application programming interface (API) 114 to communicate with the automation driver 112 to provide instructions to the first browser 110a.

In some embodiments, the automation API 114 is an API distributed by the Selenium Project, a member of the Software Freedom Conservancy, Inc. of Brooklyn, N.Y. In one of these embodiments, the controller application 106 includes functionality for using the automation API 114 to send commands to the automation driver 112, which in turn uses the received commands to execute instructions with the first browser 110a.

In some embodiments, the automation driver 112 is a software program. In other embodiments, the automation driver 112 is a hardware module. In some embodiments, the automation driver 112 is in communication with the privacy engine 104. In other embodiments, the privacy engine 104 provides the functionality of the automation driver 112. In some embodiments, the automation driver 112 is a driver distributed by the Selenium Project, a member of the Software Freedom Conservancy, Inc. of Brooklyn, N.Y. In some embodiments, the automation driver 112 is a plugin to the first browser 110a. In one of these embodiments, executing the automation driver 112 results in a browser which can be controlled without user involvement. Unlike conventional automation drivers, which may be used to test functionality of browsers and/or web-based applications (e.g., to retrieve and render a web page, by one computer, from another computer, over a network, in order to determine how the page renders) the automation driver 112 as used by the system 100 is used for its functionality to automatically generate computer network traffic simulating a type of computer network traffic that a human user might generate but without involvement of the human user.

In some embodiment, the profile database 108 is a software program. In other embodiments, the profile database 108 is a hardware module. In some embodiments, the profile database 108 is in communication with the privacy engine 104. In other embodiments, the privacy engine 104 provides the functionality of the profile database 108.

In some embodiments, the profile database 108 is an ODBC-compliant database. For example, the profile database 108 may be provided as an ORACLE database, manufactured by Oracle Corporation of Redwood Shores, Calif. In other embodiments, the profile database 108 can be a Microsoft ACCESS database or a Microsoft SQL server database, manufactured by Microsoft Corporation of Redmond, Wash. In other embodiments, the profile database 108 can be a SQLite database distributed by Hwaci of Charlotte, N.C., or a PostgreSQL database distributed by The PostgreSQL Global Development Group. In still other embodiments, the profile database 108 may be a custom-designed database based on an open source database, such as the MYSQL family of freely available database products distributed by MySQL AB Corporation of Uppsala, Sweden. In other embodiments, examples of databases include, without limitation, structured storage (e.g., NoSQL-type databases and BigTable databases), HBase databases distributed by The Apache Software Foundation of Forest Hill, Md., MongoDB databases distributed by 10Gen, Inc., of New York, N.Y., and Cassandra databases distributed by The Apache Software Foundation of Forest Hill, Md. In further embodiments, the database may be any form or type of database.

Figure 1B:
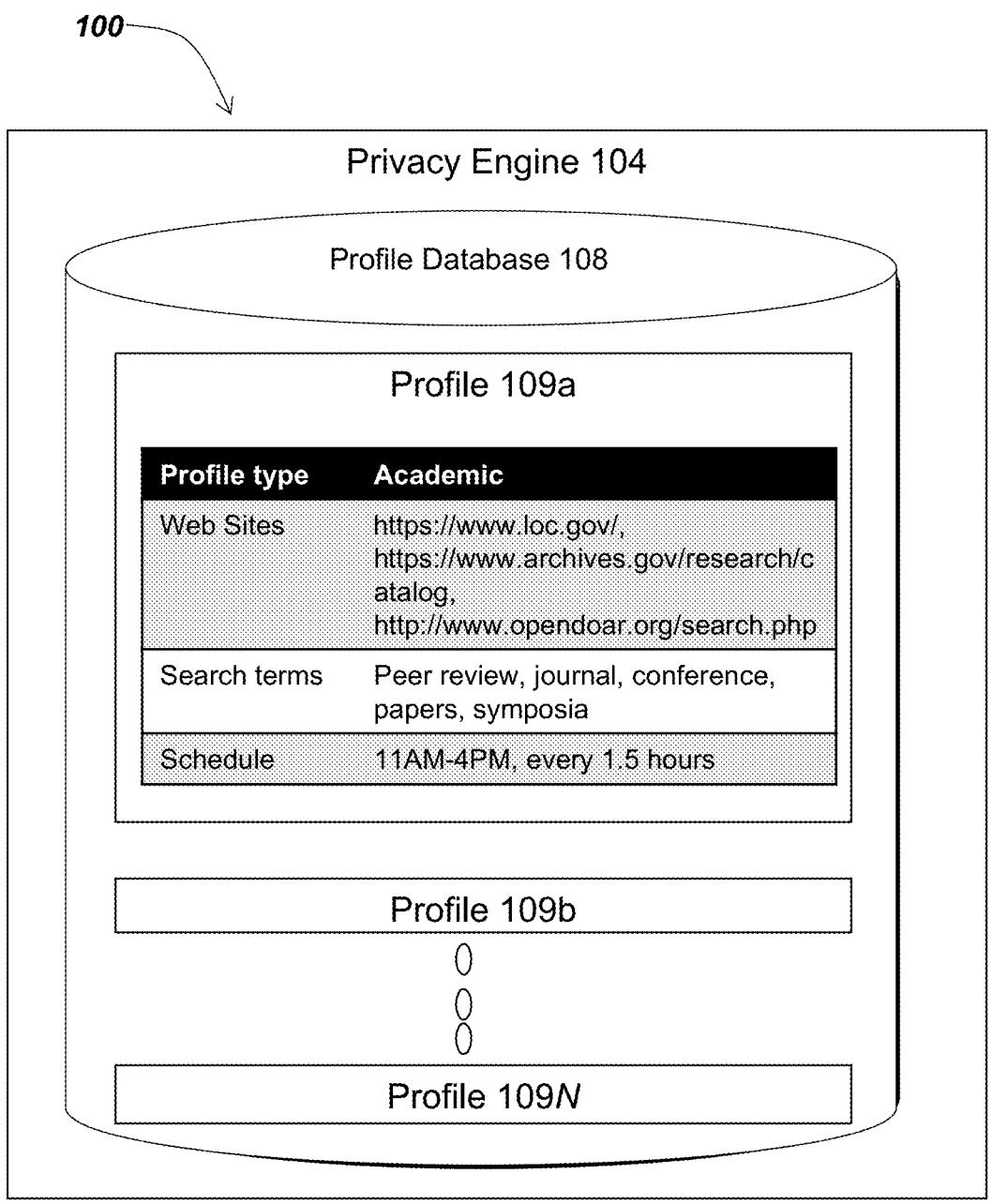
FIG. 1B is a block diagram depicting one embodiment of a profile for use in a system for protecting user-generated data in computer network traffic.

Referring ahead to FIG. 1B, a block diagram depicts one embodiment of a profile for use in a system for protecting user-generated data in computer network traffic. As shown in FIG. 1B, the profile database 108 may store one or more profiles 109, each of which may be accessed by the controller application 106. The profiles 109 may be any type or form of data structure (e.g., table, spreadsheet, word processing file, array, a lightweight data-interchange format data structure (e.g., JavaScript Object Notation data structure), markup language file (e.g., a YAML Ain't Markup Language (YAML) file) and so on) capable of storing (e.g., in physical memory on a computing device accessible to the profile database 108) an identifier of a profile and profile data such as, without limitation, browser state data, sample search terms, and sample Uniform Resource Locations (URLs), schedules for searching, keywords matching "interesting" content, behaviors, frequency of behaviors, and verbs, adjectives, and nouns for generating search phrases. The profile 109 may include a description of a type of the profile 109. The profile 109 may include data that the controller application 106 may use to automatically generate content for use by the first browser 110a. By way of example, and without limitation, the profile 109 may include a listing of web sites to visit when generating network traffic, a listing of search terms to use when generating network traffic include requests to search engines, and a schedule of times at which to generate network traffic.

In some embodiments, profiles are generated manually. In other embodiments, profiles are generated automatically (e.g., by the system 100). In one of these embodiments, the system 100 may include a natural language processing engine (not shown) that the system 100 leverages to generate profiles. For example, the natural language processing engine may identify words that are more common in a corpus of training documents and generating an output file (such as a file in a markup language) that includes at least a subset of common terms. In further embodiments, profiles are generated through a combination of automatic and manual processes. The system 100 may receive an instruction to generate a profile. The system 100 may receive an instruction to generate a type of profile. The system 100 may generate a file (e.g., a markup language file) containing profile data.

As another example, a profile 109 might include text such as the following:

Name: Docker Engineer
Keywords: #These keywords represent interests, and configure the engine to be more likely to select links that contain one or more keywords
["Docker", "docker", "docker-engine", "tectonic", "coreos", "Core OS", "Containers", "Kubernetes", "Swarm", "Docker Swarm", "Microservices", "Containerization", "Amazon ECR", "AWS", "ETCD", "Fleet", "Flannel"]
FavoriteSites:
[docker.com, coreos.com, kubernetes.io, stackoverflow.com]
ShoppingAdjs: ["download", "license for", "free"]
ShoppingList: #To make a shopping term, I take an adj and a list item ie "license for CoreOS" [vmware, vmware workstation, AWS CLI, eclipse, tectonic, Coreos, Coreos Instance, VPC, Azure VPC, AWS VPC]
FavoriteStores: #Checks the hours and the nearest location of these [apple store, chipotle, qdoba, five guys]
NewsSites: ["http://www.techcrunch.com", "http://www.news.ycombinator.com"]
SearchTerms: #pre-defined search terms, for things that a person would "check on" occasionally [Next docker release, docker release new features, next release of kubernetes, docker on fedora, docker on CentOS, docker container failed to start, docker daemon spawns endless thread, failed to start docker daemon]
PlusVerhs: [upgrade, update, latest]
PlusNouns: #Works much like shopping . . . takes a verb and a noun to make something like "update linux kernel" as search term—[kubernetes, Docker Swarm, docker release, docker for mac, ubuntu LTS, apt package manager, linux kernel, linux lxc, ubuntu kernel, docker registry, CoreOS release, tectonic release, locksmithd]

NegativeVerbs:

[error]

NegativeNouns: #Opposite of plus . . . takes a verb and a noun to make something like "error docker daemon died" as search term

[docker kernel panic, docker container died, docker daemon died, cannot start swarm mode, cannot start docker daemon, cannot lock refs git, cannot reach apt repository, cannot upgrade docker package, cannot remove docker image]

BrowseRatio: 6 #defining ratio of how often each behaviour should be used

ShoppingRatio: 1 #as one would expect of an engineer, this profile reads a lot of documentation, but rarely shops AttentionSpan: 5 #Average number of pages it will read on a given site As a further example, another profile 109 might include profile information to emulate a type of user interested in exotic plants, such as the following information:

Name: Botanist

Keywords: #These keywords represent interests, and configure the engine to be more likely to select links that contain one or more keywords

[*Nepenthes, Drosera, Plumeria, Mimosa, Sarracenia*, C3 Photosyntesis, C4 Photosynthesis, CAM Photosynthesis, Nitrogen Ratio, Phosphorus Ratio, Carnivory, Carnivorous Plants]

FavoriteSites: #Alternative embodiment to dynamically selecting "favorite sites"

[wikipedia.com, usbg.gov]

ShoppingAdjs:

["where to get", "where to buy",]

Shopping List:

[Vermiculite, Perlite, Sphagnum Moss, Coconut Husk, Peat Moss, *Nepenthes Raja*, non-alkaline plant pots, 6500K fluorescent bulbs, plant lights, high phosphorous fertilizer, jack's blossom booster fertilizer, fluorescent bulb ballast]

FavoriteStores: #Checks the hours and the nearest location of these

[home depot, loves, walmart]

NewsSites:

["http://www.botany.org"]

SearchTerms: #pre-defined search terms, for things that a person would "check on" occasionally

[Correct soil P.H. for *nepenthes, plumeria* cultivars, *nepenthes* hybrids, how often to feed *Drosera capensis*, how to get *Drosera* to flower, *plumeria* dormancy period]

PlusVerbs:

[how to grow, how much to water, best humidity for, how much light for]

PlusNouns:

[*Nepenthes Sanguinea, Nepenthes Mirabilis, Nepenthes Raja, Drosera Capensis, Drosera albansis, Plumeria Frangipani, Nepenthes* pitcher plant, *Plumeria, Ficus*, flowering *Ficus, Mimosa Pudica*, Sensative Plant]

NegativeVerbs:

[how to get rid of, how to deal with]

NegativeNouns:

[spider mites, aphids, plant fungus, mold, dust mold, grey mold, pesticide resistant spider mites, mites]

BrowseRatio: 6

ShoppingRatio: 1

Attention Span 7

As these examples show, the profile 109 may, in some embodiments, more information than a simple list of network addresses or uniform resource identifiers that the first browser 110a should contact or a list of terms for providing to a search engine, but may include additional customizable instructions such as how long the first browser 110a should stay on a particular web page before loading a different page or instructions for constructing a more detailed search phrase. The profile 109 may include more than randomly generated data or substantially randomly generated data. For example, the profile 109 may include data selected for inclusion in order to have the profile 109 bear a greater resemblance to user-generated content. As discussed in further detail in connection with FIGS. 3A-3C, this may, for example, result in a profile 109 that precludes or makes challenging attempts for filtering or statistical analysis that can identify the profile 109 as anything other than a profile containing user-generated content.

Referring back to FIG. 1A, in some embodiments, the first browser 110a is a software program. In other embodiments, the first browser 110a is a hardware module. In some embodiments, the first browser 110a is in communication with the privacy engine 104. In other embodiments, the privacy engine 104 provides the functionality of the first browser 110a. As will be understood by those of ordinary skill in the art, the first browser 110a may be any type or form of web browsing application, e.g., an application executed by a computing device that receives user content and uses the received user content to generate and send computer network traffic on behalf of the user and displays responses to the traffic received from other computers; for example, the first browser 110a may receive user input such as uniform resource locators (URLs) and internet protocol (IP) addresses for identifying computers to which the first browser 110a should transmit network traffic and the first browser 110a may receive user input such as user-generated content that the first browser 110a should include in transmitted network traffic allowing users to, by way of example, interact with user interface provided by the contacted computers (e.g., the first browser 110a may receive search terms for transmitting to a search engine). Examples of browsers include, without limitation, MOZILLA FIREFOX provided by the Mozilla Foundation of San Francisco, Calif.; GOOGLE CHROME provided by Google Inc. of Mountain View, Calif.; and MICROSOFT INTERNET EXPLORER provided by Microsoft Corporation of Redmond, Wash. In one embodiment, the first browser 110a executes the automation driver 112 and executes instructions received from the controller application 106 via the automation driver 112.

Although described above as a web browsing application, including commercially available products such as FIREFOX, CHROME, and INTERNET EXPLORER, one of ordinary skill in the art would understand that any application that generates computer network traffic may be used, even if it does not provide the functionality of a conventional "browser" application. By way of example, the privacy engine 104 may include functionality that generates fake torrent traffic but which may or may not have the functionality of a conventional browser (for example, it might not have a user interface for entering network addresses or bookmarking web site addresses). Therefore, the first browser 110a may be any web traffic generating application, including stateful web traffic generating applications and torrent clients. As another example, the application may provide browser-based messaging applications allowing a user to exchange messages with one or more other users. As will be understood by one of ordinary skill in the art, the application may generate network data of any type and need not be restricted to web browsing data.

In some embodiments, the second browser 110b is a software program. In other embodiments, the second browser 110b is a hardware module. In some embodiments, the second browser 110b is in communication with the privacy engine 104. A user of the system 100 may interact directly with the second browser 110b. As will be understood by those of ordinary skill in the art, the second browser 110b may be any type or form of web browsing application, e.g., an application executed by a computing device that receives user content and uses the received user content to generate and send computer network traffic on behalf of the user and displays responses to the traffic received from other computers; for example, the second browser 110b may receive user input such as uniform resource locators (URLs) and internet protocol (IP) addresses for identifying computers to which the second browser 110b should transmit network traffic and the second browser 110b may receive user input such as user-generated content that the second browser 110b should include in transmitted network traffic allowing users to, by way of example, interact with user interface provided by the contacted computers (e.g., the second browser 110b may receive search terms for transmitting to a search engine). Examples of browsers include, without limitation, MOZILLA FIREFOX distributed by the Mozilla Foundation of San Francisco, Calif.; GOOGLE CHROME provided by Google Inc. of Mountain View, Calif.; and MICROSOFT INTERNET EXPLORER provided by Microsoft Corporation of Redmond, Wash.

In some embodiments, the synchronization application 118 is a software program. By way of example, and without limitation, the synchronization application 118 may be an application writing in the PYTHON programming language. In other embodiments, the synchronization application 118 is a hardware module. In some embodiments, the synchronization application 118 is in communication with the privacy engine 104. In other embodiments, the privacy engine 104 provides the functionality of the synchronization application 118. The synchronization application 118 may include a database (not shown) for storing data received from one or more browsers. The synchronization application 118 may include functionality for sending, to a browser, received browser state data for incorporation into a browser state of the browser.

In one embodiment, the synchronization API 120 includes commands for transmitting, from a browser, to the synchronization application 118, browser state data. For example, and without limitation, the synchronization API 120 may include commands for transmitting (e.g., posting) web cookies from a browser to the synchronization application 118. As another example, the synchronization API 120 may include commands for requesting data (e.g., web browser state data) from a browser. As a further example, the synchronization API 120 may be an API in accordance with a Representational State Transfer (REST) standard. The synchronization API 120 may include commands such as, without limitation, commands to: push cookies, push session storage, push local storage, push indexedb, pull cookies, pull session storage, pull local storage, and pull indexed. In some embodiments, other aspects of the browser state (e.g., language and user agent) are passed when the user launches the privacy engine so that those aspects can be loaded before the browser starts.

The synchronization application 118 may use the synchronization API 120 to request browser state data from the first browser 110a. The synchronization application 118 may use the synchronization API 120 to request browser state data from the second browser 110b. The synchronization application 118 may receive data formatted according to the synchronization API 120 from the first browser 110a. The synchronization application 118 may receive data formatted according to the synchronization API 120 from the second browser 110b.

In some embodiments, the browser synchronization plugin 116a is a software program. By way of example, and without limitation, the browser synchronization plugin 116a may be a JAVASCRIPT program executing in the background on a computing device. The browser synchronization plugin 116a may be a plugin to a browser application. In other embodiments, the browser synchronization plugin 116a is a hardware module. In some embodiments, the browser synchronization plugin 116a is in communication with the privacy engine 104. In other embodiments, the privacy engine 104 provides the functionality of the browser synchronization plugin 116a.

In some embodiments, the browser synchronization plugin 116a uses the synchronization application programming interface (API) 120 to exchange information with the synchronization application 118. In one of these embodiments, the browser synchronization plugin 116a uses the synchronization API 120 to exchange browser state data with the synchronization application 118. For example, the browser synchronization plugin 116a may send browser state data of the first browser 110a to the synchronization application 118. As another example, the browser synchronization plugin 116a may receive browser state data of the second browser 116b from the synchronization application 118.

In some embodiments, the browser synchronization plugin 116b is a software program. By way of example, and without limitation, the browser synchronization plugin 116a may be a JAVASCRIPT program executing in the background on a computing device. The browser synchronization plugin 116a may be a plugin to a browser application. In other embodiments, the browser synchronization plugin 116a is a hardware module. In other embodiments, the browser synchronization plugin 116b is a hardware module. In some embodiments, the browser synchronization plugin 116b is in communication with the privacy engine 104. In other embodiments, the privacy engine 104 provides the functionality of the browser synchronization plugin 116b.

In some embodiments, the browser synchronization plugin 116b uses the synchronization Application Programming Interface (API) 120 to exchange information with the synchronization application 118. In one of these embodiments, the browser synchronization plugin 116b uses the synchronization API 120 to exchange browser state data with the synchronization application 118. For example, the browser synchronization plugin 116b may send browser state data of the second browser 110a to the synchronization application 118. As another example, the browser synchronization plugin 116b may receive browser state data of the second browser 116b from the synchronization application 118. The browser synchronization plugin 116b uses received browser state data to modify the browser state of the second browser 110b. For example, if the browser synchronization plugin 116b receives, from the synchronization application 118, a web cookie that is part of the browser state of the first browser 110a, the browser synchronization plugin 116b may incorporate the web cookie into a database of cookies stored by the second browser 110b as part of its browser state.

In some embodiments, the controller application customization plugin 122 is a software program. In other embodiments, the controller application customization plugin 122 is a hardware module. In some embodiments, the controller application customization plugin 122 is in communication with the privacy engine 104. In other embodiments, the privacy engine 104 provides the functionality of the controller application customization plugin 122. In one embodiment, the second browser 110b executes the controller application customization plugin 122. For example, by executing the controller application customization plugin 122, the second browser 110b may provide functionality allowing a user to customize the controller application 106. By way of example, the controller application customization plugin 122 may allow a user to provide input such as selecting a profile from the profile database 108 that the controller application 106 should use in directing the first browser 110a via the automation driver 112. As another example, the controller application customization plugin 122 may allow a user to provide input such as modifying a profile stored in the profile database 108. As still another example, the controller application customization plugin 122 may allow a user to provide input such as modifying access right on a profile (e.g., to allow for sharing the profile with other users on the computing device 102 or with other users of other computing devices). As yet another example, the controller application customization plugin 122 may allow a user to provide input such as creating a new profile.

Although for ease of discussion the computing device 102, the privacy engine 104, the controller application 106, the profile database 108, the first browser 110a, the automation driver 112, the browser synchronization plugin 116a, the second browser 110b, the browser synchronization plugin 116b, the synchronization application 118, the synchronization API 120, the controller application customization plugin 122, and the controller customization API 124 are described as separate modules, it should be understood that this does not restrict the architecture to a particular implementation. For instance, these modules may be encompassed by a single circuit or software function or, alternatively, distributed across a plurality of computing devices. By way of example, the synchronization API 120 and the controller customization API 124 may be provided by a single API. As another example, the synchronization application 118 uses a separate database (not shown) to store browser state data. In other examples, however, the synchronization application 118 may use the profile database 108 to store browser state data. As another example, the functionality of the synchronization application 118 and of the synchronization API 120 may be provided by a single application (e.g., by an XPI file or a JAVASCRIPT application).

Figure 1C:
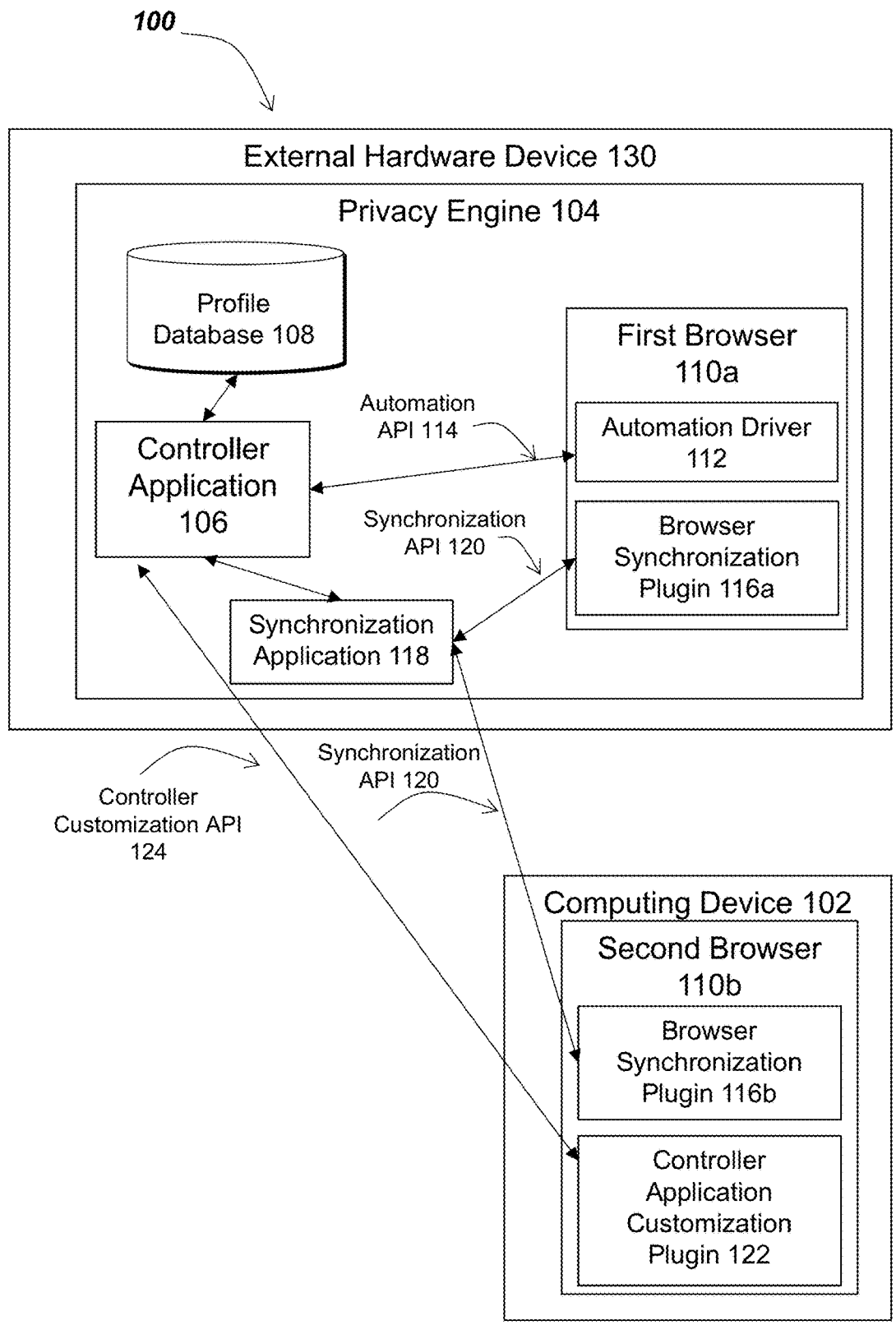
FIG. 1C is a block diagram depicting an embodiment of a system for synchronizing, in a browser state of a web browser application, automatically-generated content and user-generated content.

Referring now to FIG. 1C, a block diagram depicts another embodiment of a system for synchronizing, in a browser state of a web browser application, automatically-generated content and user-generated content to confound analytics of computer network traffic including data associated with the synchronized browser state. As depicted in FIG. 1C, the privacy engine 104 and its sub-components may be executed on an external hardware device 130, separate from the computing device 102. By way of example, the hardware device 130 may be a Raspberry Pi. The computing device 102 may have a physical connection to the hardware device 130 (e.g., via a wired connection such as a USB connection). The computing device 102 may have a wireless connection to the hardware device 130 (e.g., via WiFi). This type of deployment is also relatively affordable, easy to deploy, and does not burden the computing device 102 with extra processes since the additional network traffic generation takes place on a separate appliance. In some embodiments, the APIs on the privacy engine 104 provide a basic authentication mechanism, which may prevent other network devices from accessing the APIs or the browser state information on the privacy engine 104.

Figure 1D:
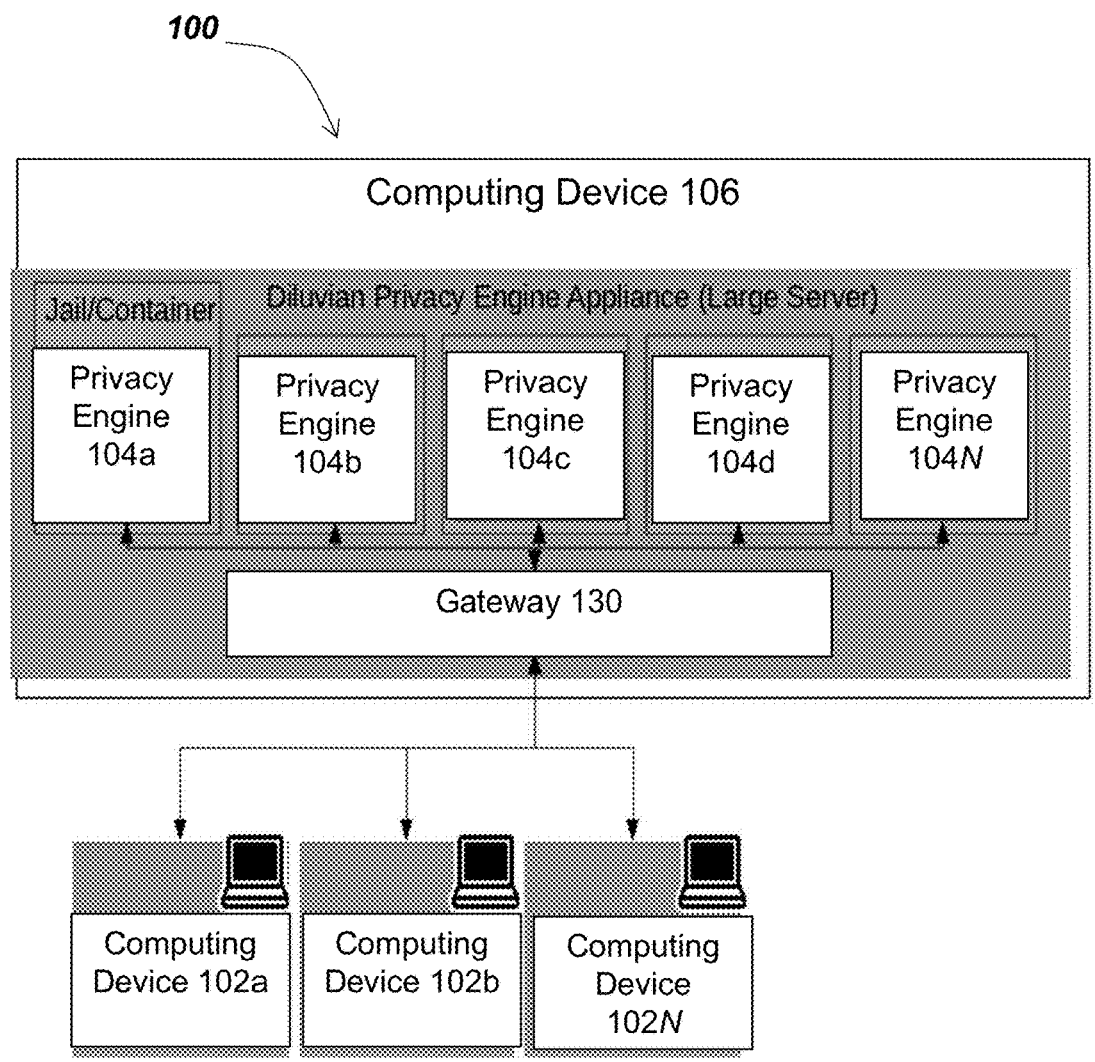
FIG. 1D is a block diagram depicting an embodiment of a system for synchronizing, in a browser state of a web browser application, automatically-generated content and user-generated content.

Referring now to FIG. 1D, a block diagram depicts another embodiment of a system for synchronizing, in a browser state of a web browser application, automatically-generated content and user-generated content to confound analytics of computer network traffic including data associated with the synchronized browser state. As depicted in FIG. 1D, the system 100 may include a plurality of privacy engines 104a-N and a plurality of computing devices 102a-N executing in a distributed computing environment. Each of the plurality of privacy engines 104 may be a privacy engine as described above in connection with FIG. 1A. The plurality of privacy engines 104a-N may all execute on a single machine 106 (e.g., a server). The plurality of privacy engines 104a-N may execute on a plurality of machines 106. Each of the computing devices 102a-N may be a computing device 102 as described above in connection with FIG. 1A. A distributed implementation as depicted in FIG. 1D may allow for an entity (such as, for example, an enterprise) to protect a plurality of workstations. It should be noted that not all the privacy engine instances have to be in sync with a user workstation. In this configuration, an enterprise could easily add privacy engine instances in order add fake employees to their network, further hindering attempts at data collection and protecting the organization's privacy. In the architecture depicted, each privacy engine instance runs in a jail or container, as to isolate the processes and file system from other privacy engine instances on the same server. This is a security measure: in the unlikely event that a malicious client compromised a privacy engine, the attacker would only have access to information in the privacy engine instance compromised. To prevent browser states from being mixed across clients, each client is routed to a different privacy engine instance via the gateway on the server. The basic authentication that exists on the privacy engine APIs also prevents clients from attempting to access privacy engine instances they are not assigned.

Figure 1E:
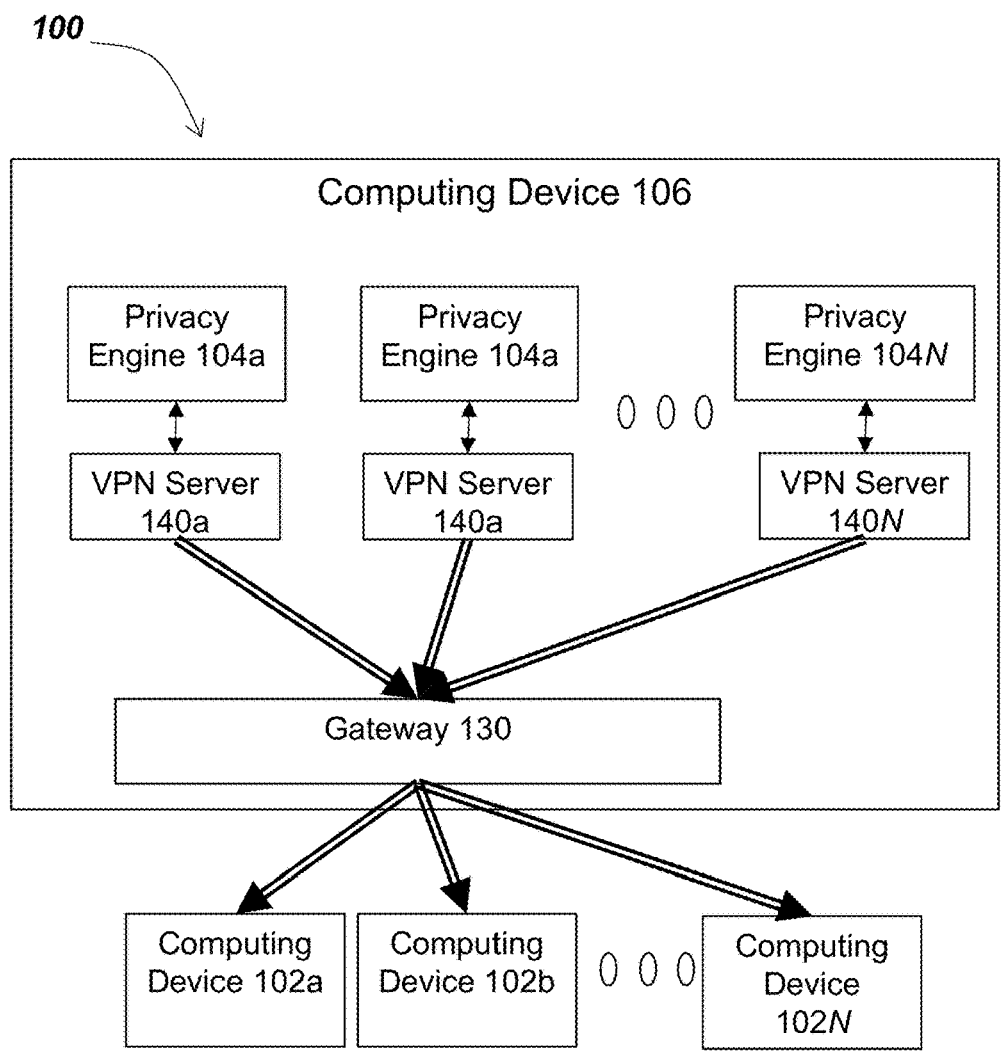
FIG. 1E is a block diagram depicting an embodiment of a system for synchronizing, in a browser state of a web browser application, automatically-generated content and user-generated content.

Referring now to FIG. 1E, a block diagram depicts another embodiment of a system for synchronizing, in a browser state of a web browser application, automatically-generated content and user-generated content to confound analytics of computer network traffic including data associated with the synchronized browser state. As depicted in FIG. 1E, client computing devices may connect through a gateway 130 to a VPN server 140. The connection may be a VPN tunnel. Double-line arrows identify the VPN tunnels in FIG. 1E. Clients may connect to the VPN hosted alongside each privacy engine 104, and it is as if they are on the same LAN. This deployment is ideal for mobile devices, as regardless of how they are connecting to the internet, they are protected by a privacy engine 104. This architecture allows for the privacy engine 104 to be delivered as a service, in a "privacy as a service" type model, usable by even the least technical consumer and available all over the world.

The privacy engine 104 and the use of VPNs may be implemented to work in synergy for maximum privacy. The VPN tunnel may prevent web resources from determining an actual IP address of a client computing device 102. The ISP is still capable of determining the actual IP address since the tunnel goes over the ISP network but attempts to exploit this may be thwarted by the privacy engine 104, since the exit of the tunnel is also sending traffic from the privacy engine 104, camouflaging the user-generate content.

Figure 1F:
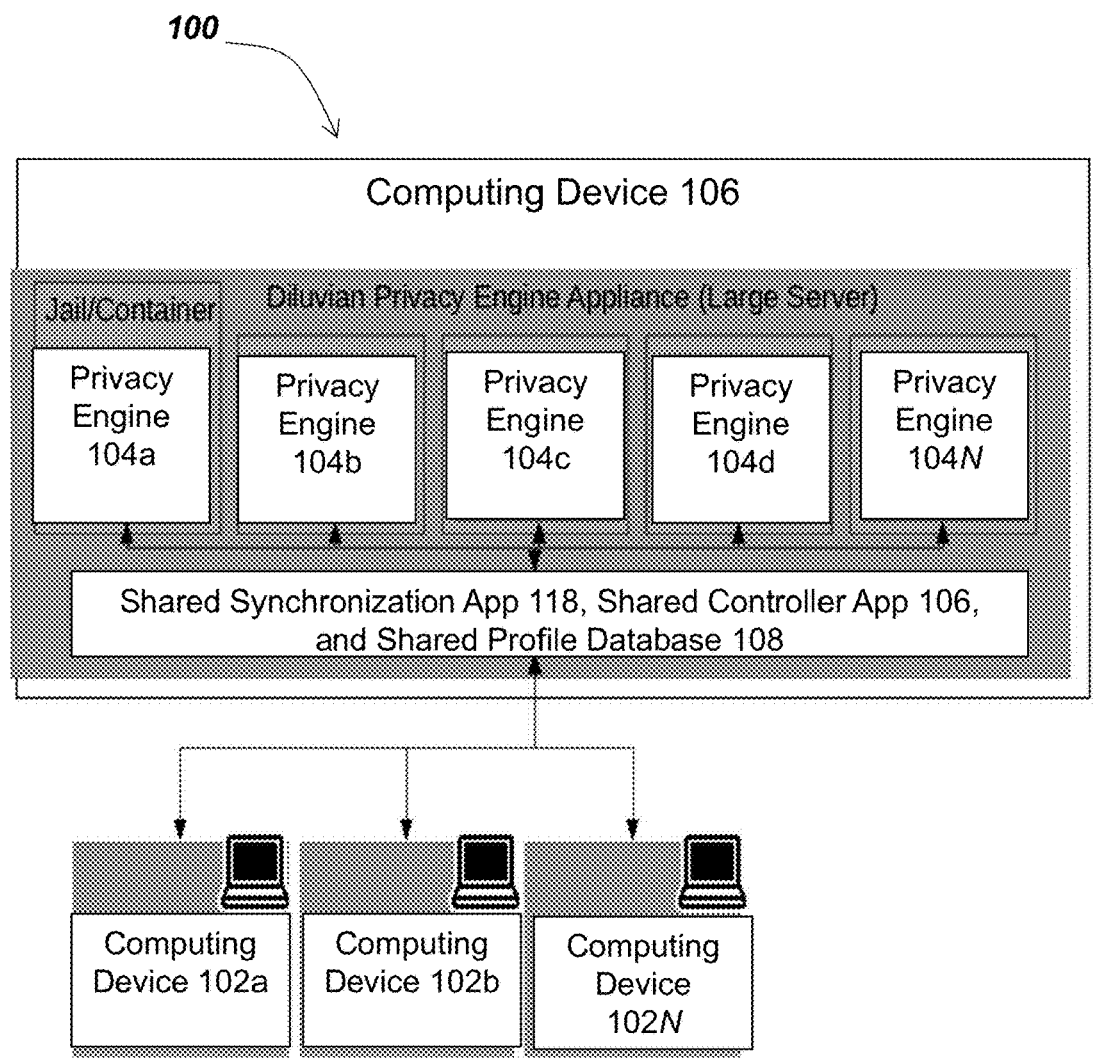
FIG. 1F is a block diagram depicting an embodiment of a system for synchronizing, in a browser state of a web browser application, automatically-generated content and user-generated content.

Referring now to FIG. 1F, a block diagram depicts another embodiment of a system for synchronizing, in a browser state of a web browser application, automatically-generated content and user-generated content to confound analytics of computer network traffic including data associated with the synchronized browser state. As depicted in FIG. 1F, the system 100 may include a plurality of privacy engines 104a-N, a shared synchronization application 118, a shared controller application 106, a shared profile database 108, and a plurality of computing devices 102a-N executing in a distributed computing environment. Each of the plurality of privacy engines 104 may be a privacy engine as described above in connection with FIG. 1A; however, in contrast to the depiction in FIG. 1A, certain functionality is shared amongst the plurality of privacy engines 104a-N, including the shared synchronization application 118, the shared controller application 106, and the shared profile database 108. The plurality of privacy engines 104a-N may all execute on a single machine 106 (e.g., a server). The plurality of privacy engines 104a-N may execute on a plurality of machines 106. Each of the computing devices 102a-N may be a computing device 102 as described above in connection with FIG. 1A. A distributed implementation as depicted in FIG. 1F may allow for an entity (such as, for example, an enterprise) to protect a plurality of workstations. In the architecture depicted, each privacy engine instance runs in a jail or container, as to isolate the processes and file system from other privacy engine instances on the same server. However, in contrast with FIG. 1D and as indicated above, the privacy engines 104a-N do not include individual profile databases nor are they accessible via separate APIs—the shared synchronization application 118, the shared controller application 106, and the shared profile database 108 are shared by each privacy engine in the plurality of privacy engines 104a-N in the architecture depicted by FIG. 1F and each of the computing devices 102a-N may access one of the privacy engines 104a-N via those shared resources.

Figure 2:
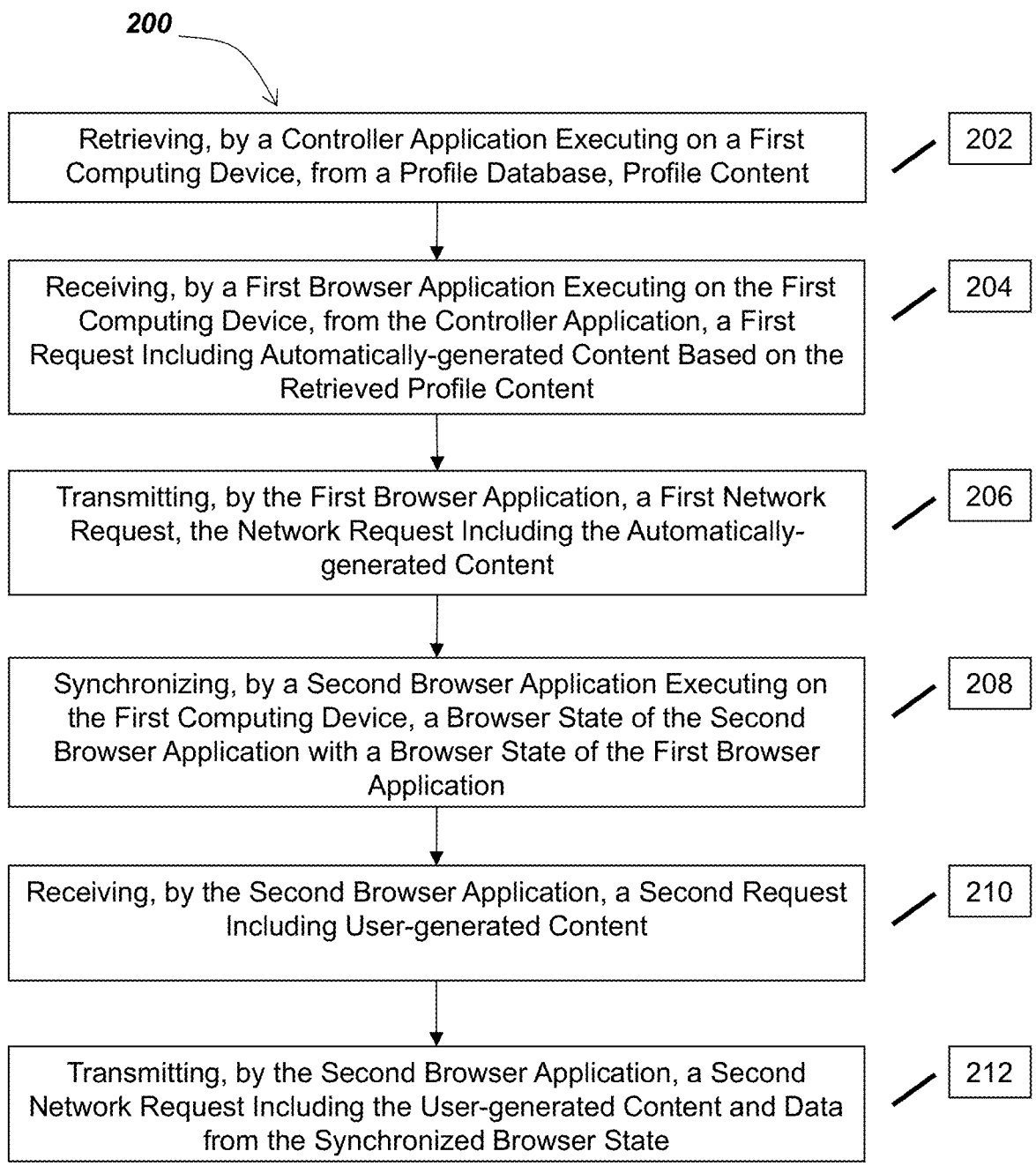
FIG. 2 is a flow diagram depicting an embodiment of a method for synchronizing, in a browser state of a web browser application, automatically-generated content and user-generated content.

Referring now to FIG. 2, a block diagram depicts one embodiment of a method 200 for synchronizing, in a browser state of a web browser application, automatically-generated content and user-generated content to confound analytics of computer network traffic including data associated with the synchronized browser state. In brief overview, the method 200 includes retrieving, by a controller application executing on a first computing device, from a profile database, profile content (202). The method 200 includes receiving, by a first browser application executing on the first computing device, from the controller application, a first request including automatically-generated content based on the retrieved profile content (204). The method 200 includes transmitting, by the first browser application, a first network request, the network request including the automatically-generated content (206). The method 200 includes synchronizing, by a second browser application executing on the first computing device, a browser state of the second browser application with a browser state of the first browser application (208). The method 200 includes receiving, by the second browser application, a second request including user-generated content (210). The method 200 includes transmitting, by the second browser application, a second network request including the user-generated content and data from the synchronized browser state (212).

Referring now to FIG. 2 in greater detail, and in connection with FIGS. 1A-1E, the method 200 includes retrieving, by a controller application executing on a first computing device, from a profile database, profile content (202). In one embodiment, a user has specified a profile 109 for the controller application 106 to use. In another embodiment, the controller application 106 selects a profile 109 without user direction. For example, the system 100 may determine an area of interest to a user (e.g., by retrieving data such as browser data from a machine associated with a user, including, without limitation, a personal computing device of the user as well as network devices that monitor or have access to user-generated traffic, and instructing a natural language processing engine to analyze the retrieved data and receiving an identification of at least one common term in the user-generated traffic that the system 100 uses to identify an area of interest to the user). The system 100 may then identify a profile 109 that includes keywords identified with areas of interest that are substantially different from the area of interest to the user.

The controller application 106 may use profile content retrieved from a profile 109 in the profile database 108 to generate computer network traffic including automatically generated content. By way of example, the controller application 106 may retrieve a search term from a profile 109 and use the text of the search term when directing the generation of computer network traffic. Continuing with this example, the controller application 106 may generate an instruction to the automation driver 112, based on the automation API 114, the instruction directing the automation driver 112 to execute a web search with the first browser 110a using the retrieved search terms. As another example, the controller application 106 may retrieve profile data identifying a time of day at which the controller application 106 should generate computer network traffic. As yet another example, the controller application 106 may retrieve a URL to provide to the automation driver 112 with an instruction to direct the first browser 110a to retrieve a web page available at the URL. The controller application 106 may execute a retrieved instruction (e.g., retrieving profile data or URLs or performing other instructions). The actions of the controller application 106 and/or the automation driver 112 may result in the generation of new browser state data and the storing of the new browser state data by the first browser 110a.

The method 200 includes receiving, by a first browser application executing on the first computing device, from the controller application, a first request including automatically-generated content based on the retrieved profile content (204). In one embodiment, the first browser 110a receives, from the controller application 106, via the automation driver 112, a request for execution. For example, the request may be a request to execute a web search (e.g., to go to a URL or IP address associated with a search engine and to enter one or more terms provided by the controller application 106).

The method 200 includes transmitting, by the first browser application, a first network request, the network request including the automatically-generated content (206). The first browser application 110a executes instructions received directly or indirectly from the controller application 106 to access one or more computers across a network, generating computer network traffic.

The method 200 includes synchronizing, by a second browser application executing on the first computing device, a browser state of the second browser application with a browser state of the first browser application (208). As the first browser 110a generates computer network traffic, the first browser 110a develops browser state data (e.g., web cookies received over a network from other computers); the first browser 110a may transmit this browser state data to the synchronization application 118 for synchronization with browser state data of the second browser 110b. For example, the first browser 110a may transmit one or more web cookies to the synchronization application 118 using the synchronization API 120 and the synchronization application 118 may transmit the received one or more web cookies to the browser synchronization plugin 116b executed by the second browser 110b (e.g., by transmitting, to the browser synchronization plugin 116b, a file, such as a JSON file, including the one or more web cookies). The browser synchronization plugin 116b may incorporate the received one or more web cookies into data associated with the second browser 110b (e.g., copying the web cookie into a cache for cookies associated with the second browser 110b).

Having incorporated the browser state of the first browser 110a into the browser state of the second browser 110b, the privacy engine 104 has provided the second browser 110b with a browser state that includes data associated with at least two entities—data associated with the human user of the second browser 110b and data associated with computer network traffic generated by the first browser 110a based on data retrieved from the profile selected by the controller application 106. The controller application 106 may have selected a profile intended to confound an attempt to analyze preferences or interests of the human user. For example, and without limitation, a user of the system 100 may specify that she is a network security expert researching computer viruses and wishes to camouflage her interests; the profile databases 108 may include a plurality of profiles 109 from which the user may select a profile 109. Continuing with this example, the user might select a profile 109 intended to add variety to her browser state (e.g., the state of second browser 110b) so that instead of only including data related to computer viruses or network security topics generally, the browser state data might also include cookies from other unrelated web sites. Continuing with this example, the user might select a profile 109 of an academic searching for academic publications on medieval history in non-security-related sites or a profile 109 of an individual interested in health and fitness (e.g., a profile 109 that would include URLs for online stores that sell yoga clothes or for meditation sites or gyms). As another example, and without limitation, the user might select a plurality of profiles 109 so that the synchronized browser data would include web cookies suggesting that the user of the second browser 110b is interested in (e.g., retrieves for rendering) web sites relating to computer security, academic papers on medieval history, and healthcare and fitness. In this way, an entity reviewing the browser state of the second browser 110b will not be able to discern which of the topics identified by the cookies in the browser state are topics of interest to the human user. By modifying the traffic characteristics of the user, the system minimizes the impact of unwelcome analysis on the user's data. As will be understood by those of ordinary skill in the art, analysis of web data is used for everything from targeted online advertising, targeted physical advertising (e.g., catalogs sent to the user in the mail, and in more ominous scenarios, corporate espionage; by minimizing the accuracy of the analysis, the system 100 minimizes the impact of the analysis on the user. For example, and without limitation, by modifying an analytical result by generating additional computer network traffic so that, for example, the browser data shows that network security sites comprise 10% of the pages visited by the computing device 102 instead of 100% (because 90% of the traffic was generated by the first browser 110a and related to data associated with a profile 109 instead of with the human user), the system 100 minimizes the likelihood that analytics will reveal network security to be a major interest of the user.

The method 200 includes receiving, by the second browser application, a second request including user-generated content (210). The user of the second browser application 110b may generate computer network traffic in a customary manner. For example, the user may type in a URL or IP address for the second browser application 110b to use. As another example, the user of the second browser 110b may use the browser 110b to interact with a web page provided by a remote machine such as, without limitation, a search engine that the user wants to use conduct online research.

The method 200 includes transmitting, by the second browser application, a second network request including the user-generated content and data from the synchronized browser state (212). By way of example, the second browser application may respond to a request from a third-party web site for cookie data with cookie data from the synchronized browser state (including, for example, cookie data generated by a network transaction executed by the first browser application 110a instead of the second browser application 110b).

The privacy engine described above could be integrated into existing firewalls and routers, and work in conjunction with other IT tools such as those for management and security. Such integrations would allow for an IT organization to handle all aspects of data protection through one console.

Figure 3A:
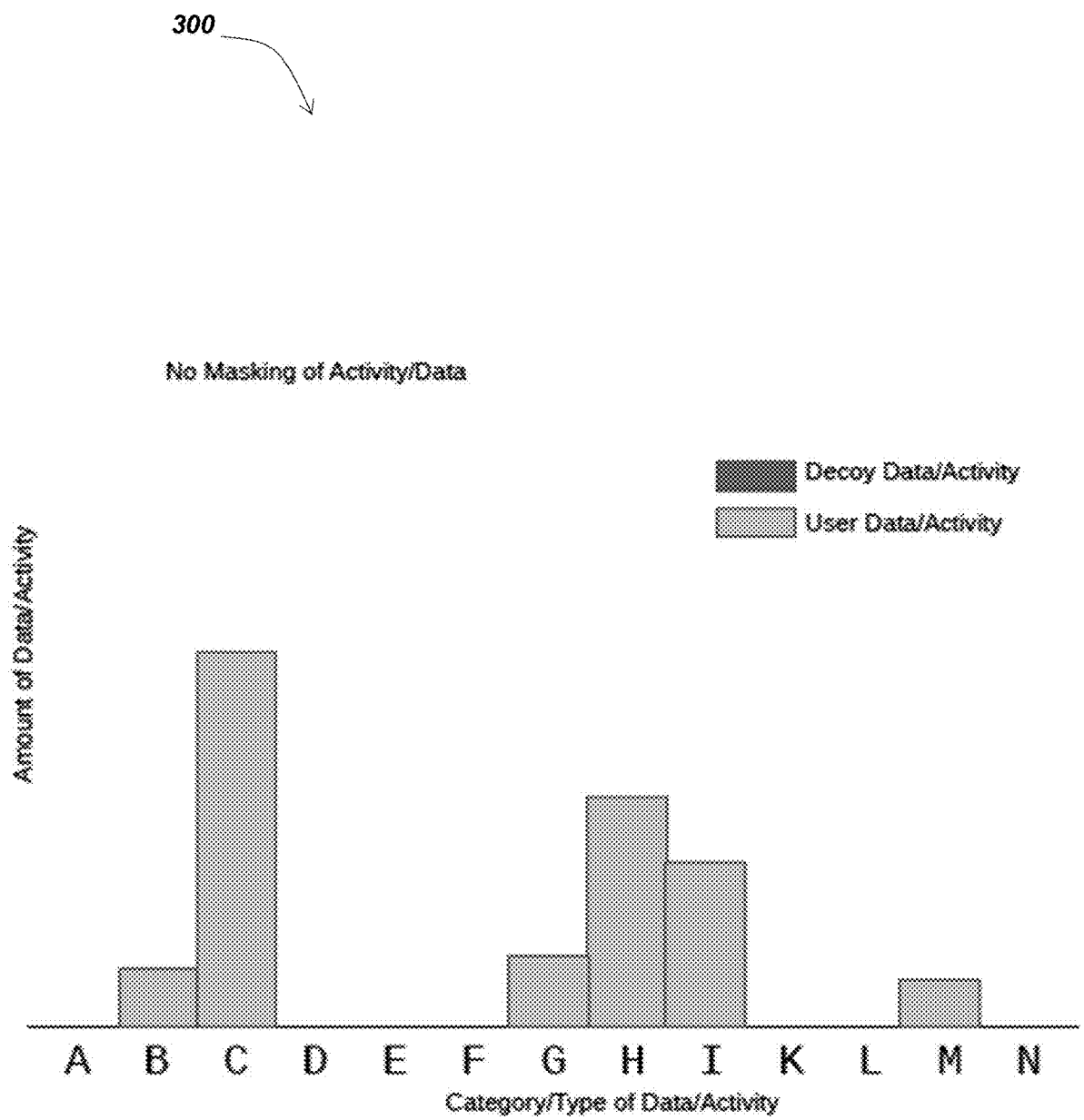
FIG. 3A depicts a graph of user-generated data categorized according to type of data prior to combination with automatically-generated content by a system for synchronizing automatically-generated content and user-generated content.

Referring now to FIG. 3A, a graph 300 depicts one embodiment of user-generated content categorized according to type of content (e.g., type of data or activity associated with the content) prior to combination with automatically-generated content by a system for synchronizing automatically-generated content and user-generated content. As can be seen in FIG. 3A, an amount of user-generated data can be used to categorize the user-generated content into different types of data that may correlate to activities; for example, there is a certain amount of user-generated data associated with type of data "B" and a higher amount of user-generated data associated with type of data "C". From this type of graph, a system may associate the user with a particular type of activity. The addition of automatically-generated content to the user-generated content may provide the user increased privacy by masking what type of activity the user-generated content relates to.

Figure 3B:
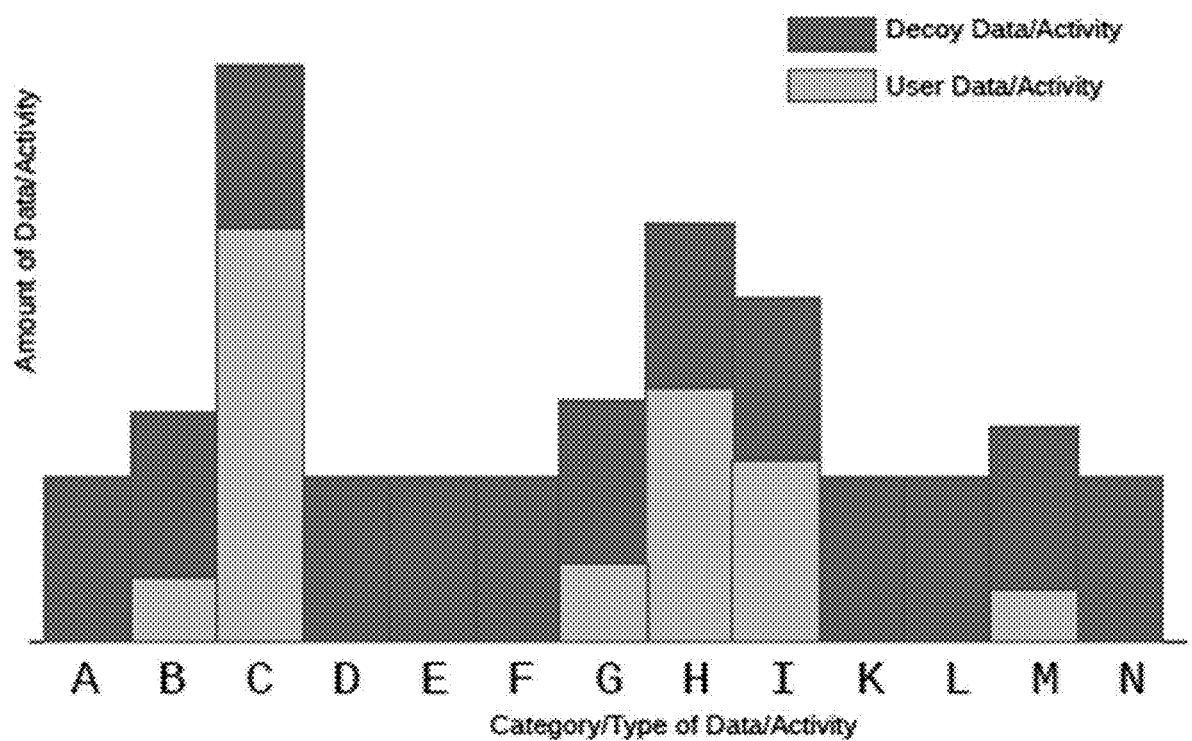
FIG. 3B depicts a graph of user-generated data in combination with automatically-generated content in which automatically-generated content is generated randomly.

Referring now to FIG. 3B, a graph 310 depicts a graph of user-generated data in combination with automatically-generated content in which automatically-generated content is generated randomly. In such an embodiment, rather than using profile data to automatically generate data that emulates user-generated data, a system might use randomly generated data. As can be seen in comparison with FIG. 3A, combining the user-generated data with automatically-generated (or "decoy" data) serves to provide a level of masking of the user-generated data, making it more challenging to determine what are the types of data or activities that are associated with the user. However, the methods and systems described above provide improvements over both randomly generated data and no automated data at all.

Figure 3C:
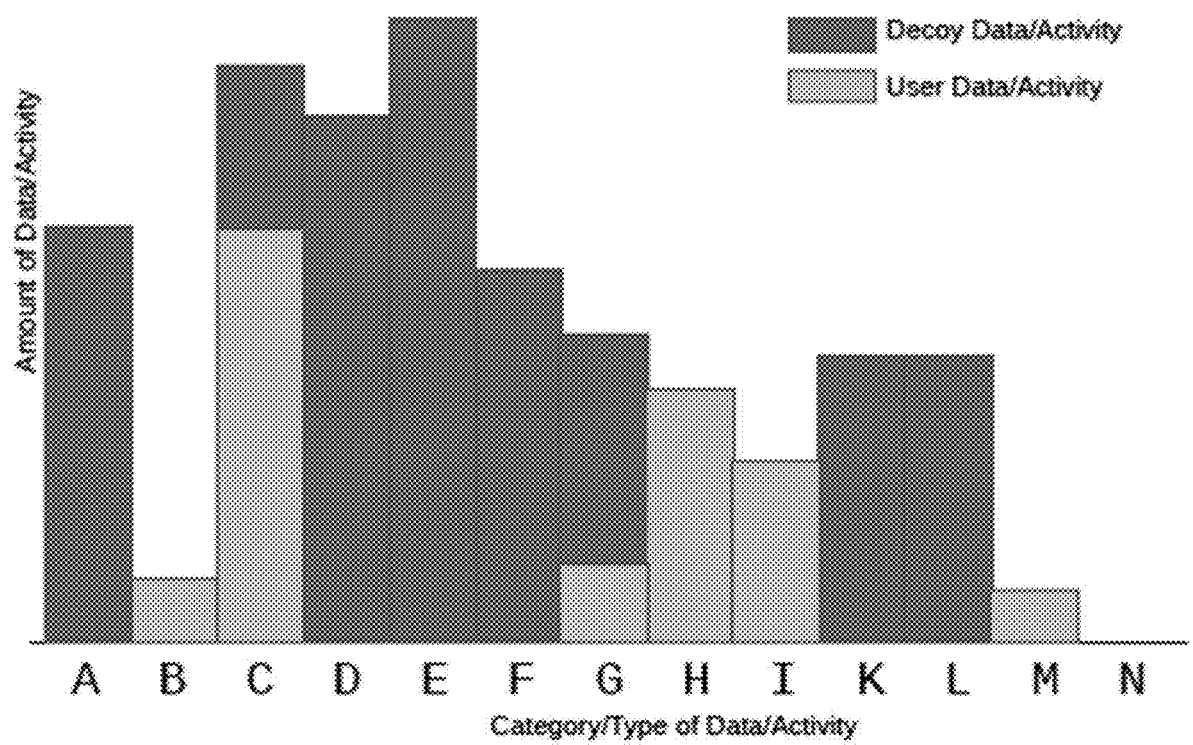
FIG. 3C depicts a graph of user-generated data in combination with automatically-generated content in which the automatically-generated content is generated by a system for synchronizing automatically-generated content and user-generated content, the system accessing at least one profile data.

Referring now to FIG. 3C, a graph 320 depicts a graph of user-generated data in combination with automatically-generated content in which the automatically-generated content is generated by a system for synchronizing automatically-generated content and user-generated content, the system accessing at least one profile data. As shown by FIG. 3C, the use of automatically-generated content in combination with user-generated content provides an improved level of masking over the level of masking provided by randomly generated data. As will be understood by those of ordinary skill in the art, although depicted in FIGS. 3B-3C as separate content types and as discussed herein as separate content types, the automatically-generated content and the user-generated content are not separated from each other and a reviewer of the user activity data (including, without limitation, browser state data, domain name service queries, and other activity data) would see a compiled set of both content types, not two different data types; that is, a reviewer of the user data would see only the aggregate of the automatically-generated content and the user-generated content.

The privacy engine described above could be used to protect individual consumers from differential pricing based on network traffic. For individual consumers, companies often profile consumers based on their personal data. This can result in different offerings, and in some cases, different prices. By way of example, if browser state data (including, for example and without limitation, cookie data) indicates that a consumer has accessed a commerce web site using a machine sold by Apple, Inc., the consumer may receive higher prices for items sold or recommended by the commerce web site (including, without limitation, retail purchases, recommendations for more expensive products, and air fare); this may be based on a presumption that an individual who can afford a computer from Apple, Inc., has more wealth than one who is using a machine sold by Microsoft, Inc., or other vendor. Users are typically unaware of the ways in which the prices and options presented to them are manipulated based on presumptions regarding demographics. Continuing with this example, the privacy engine 104 may generate computer network traffic that is generated to include data indicating it comes from a different type of machine than the type of machine used by the user; in this way, there will be computer network data associated with both Apple, Inc., hardware and non-Apple, Inc., hardware, confounding attempts to identify the hardware type and provide differential pricing. Similarly, an insurance carrier (e.g., health insurance and life insurance) may purchase consumer data to determine (without informing the consumer) whether to modify a type or cost of insurance offered to a consumer based upon a type of computer network data generated by the consumer; for example, a user who generates computer network traffic indicating an interest in healthy recipes or exercise regimens may receive a different quote than one who generates computer network traffic indicating an interest in craft beers or pizza delivery services. By using the privacy engine 104 in such a scenario, users may generate a variety of types of content for computer network data and have the privacy engine 104 generate different types of content (e.g., generating both content for local yoga classes and content for high risk activities such as rock climbing) and confound attempts by insurance carriers to classify them based on their network activity.

The privacy engine described above may be used to protect individual consumers from having accurate psychological profiles generated by third parties.

Other possible uses of the methods and systems described herein include "weaponized" privacy engines tuned not just to provide inaccurate information, but to actively mislead any would-be corporate spy, providing an even stronger disincentive for spying. By way of example, a first entity may instantiate a privacy engine 104 to generate network traffic relating to a product or area of research the first entity knows will mislead a second entity (e.g., a product the first entity knows will be a commercial failure or a research topic unrelated to research topics the second entity is interested in or a topic the second entity uses as input to a machine learning system). Furthermore, if the first entity receives corporate information about the second entity relating to the misleading information, the first entity may determine that the second entity has been spying on the first entity.

Such privacy engines 104 may also be used to divert hackers. By establishing a privacy engine 104 on a computing device 100a that is separated from a first entity's other computing devices 100, the first entity may divert hackers who view the computing device 100a as an actual resource of the entity based on the network traffic generated by the privacy engine 104 (e.g., using the computing device 100a as a diversion minimizing the hacker's effectiveness against the network as a whole, as well as a honeypot).

Entities may want to deploy privacy engines at certain physical locations as a countermeasure to attempts to tap the internet connection (e.g., governments may wish to install privacy engines 104 at one or more embassies). A privacy engine could be configured to emulate a high value target (a politician, general, intelligence officer, etc.), diverting and absorbing enemy cyberattacks; this is analogous to the inflatable tanks the army uses to draw enemy fire away from actual targets. This could also be useful for chief executive officers and other "high value" corporate executives who are undoubtedly frequently targeted.

The methods and systems described herein are broad in scope and mitigate all manner of web-based privacy threats including, without limitation, ISP, DNS lookups, websites, and third-party trackers. The methods and systems described herein provide a flexible solution for creating a variety of types of traffic. The methods and systems described herein provide a scalable solution—while a consumer VPN helps mask an individual's IP address, putting 5000 employees on a VPN is not effective at masking users because there is still an obvious large group in one block of IP addresses; in contrast, a company could instantiate as many privacy engines 104 as it has computational power to run, and can thus disguise arbitrary numbers of employees (or for that matter, create arbitrary numbers of fake employees).

The methods and systems described herein represents a novel, non-obvious, viable and highly efficacious privacy solution useful for a wide variety of privacy needs. This technology represents a great step forward in the preservation of individual privacy, intellectual property, and business strategy.

It should be understood that the systems described above may provide multiple ones of any or each of those components and these components may be provided on either a standalone machine or, in some embodiments, on multiple machines in a distributed system. The phrases 'in one embodiment,' 'in another embodiment,' and the like, generally mean that the particular feature, structure, step, or characteristic following the phrase is included in at least one embodiment of the present disclosure and may be included in more than one embodiment of the present disclosure. Such phrases may, but do not necessarily, refer to the same embodiment.

The systems and methods described above may be implemented as a method, apparatus, or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be LISP, PYTHON, PROLOG, PERL, C, C++, C#, JAVA, or any compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices, firmware, programmable logic, hardware (e.g., integrated circuit chip; electronic devices; a computer-readable non-volatile storage unit; non-volatile memory, such as semiconductor memory devices, including EPROM, EEPROM, and flash memory devices; magnetic disks such as internal hard disks and removable disks; magneto-optical disks; and CD-ROMs). Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data (including, for example, instructions for storage on non-transitory computer-readable media) from a second computer providing access to the programs via a network transmission line, wireless transmission media, signals propagating through space, radio waves, infrared signals, etc.

Figure 4A:
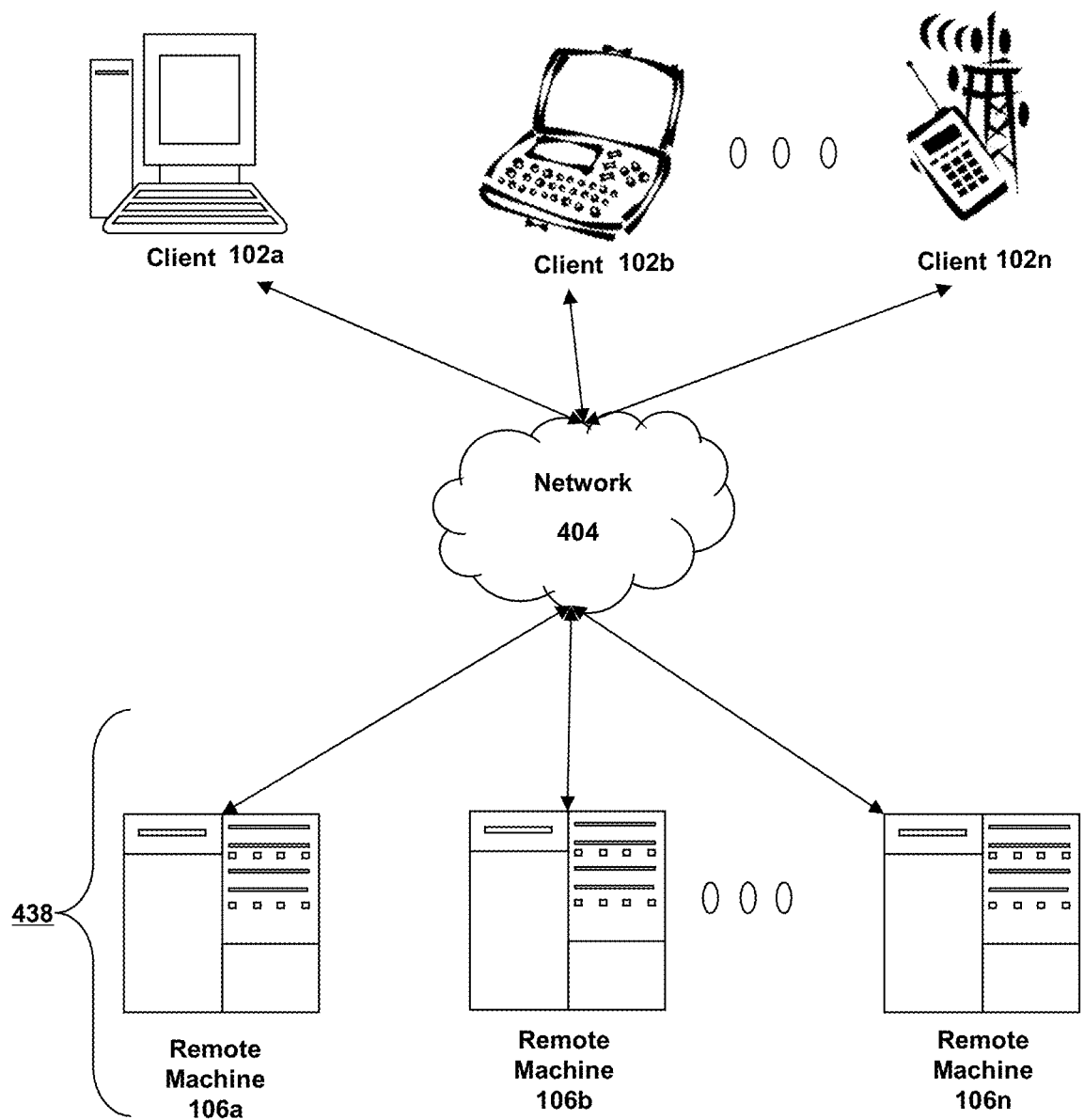
FIGS. 4A-4C are block diagrams depicting embodiments of computers useful in connection with the methods and systems described herein.
Figure 4B:
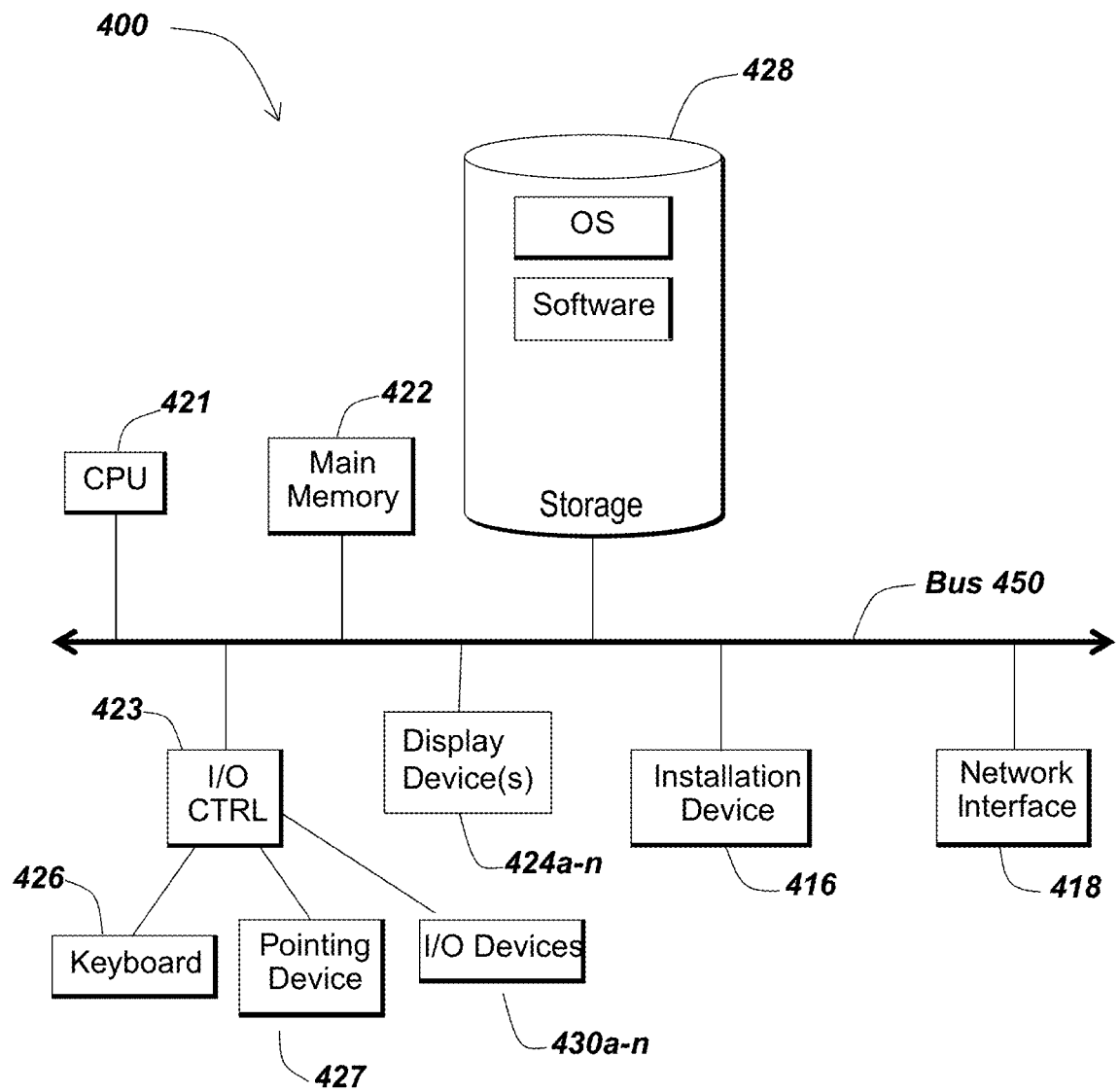
Figure 4C:
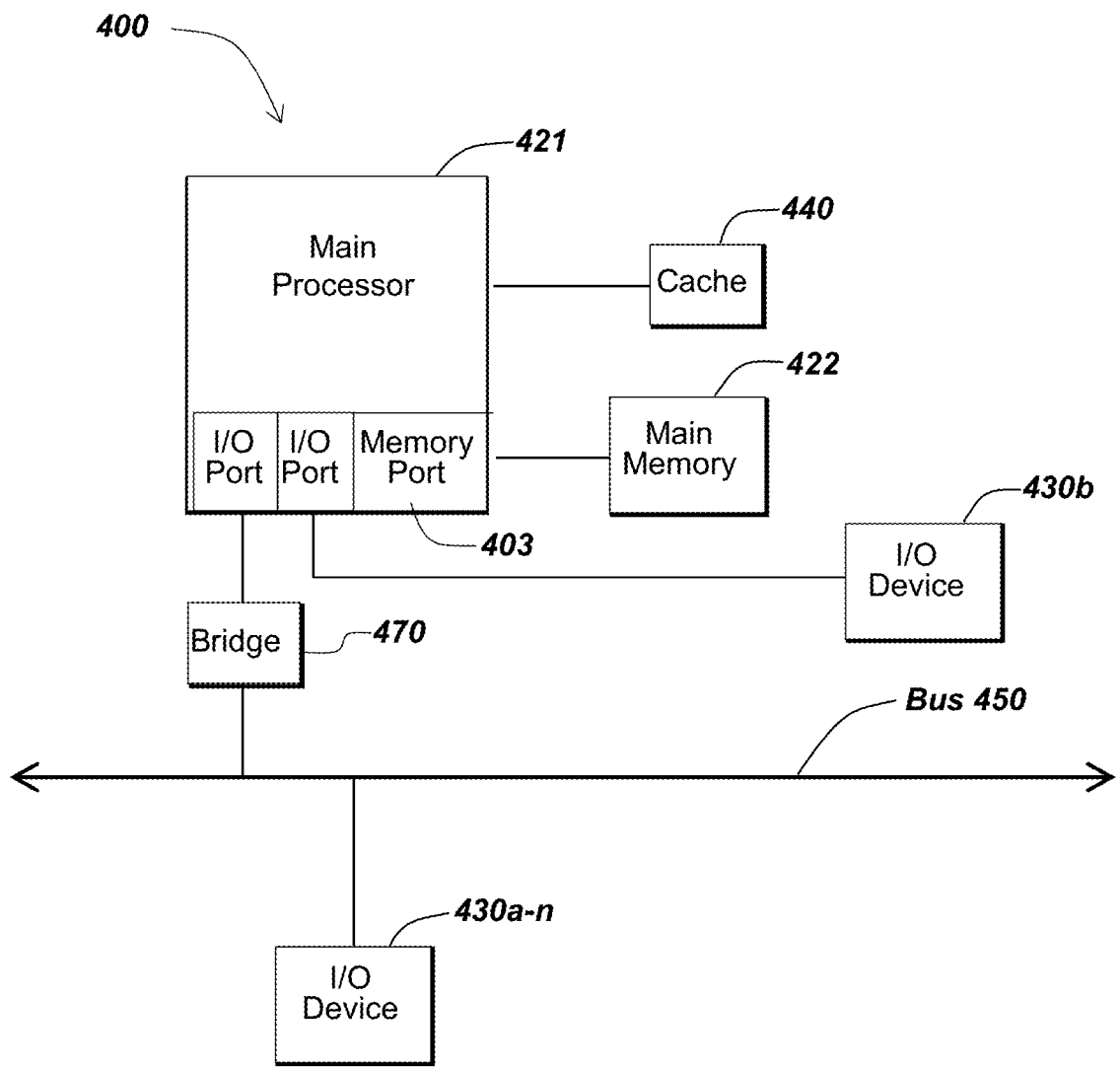

Referring now to FIGS. 4A, 4B, and 4C, block diagrams depict additional detail regarding computing devices that may be modified to execution functionality for implementing the methods and systems described above.

Referring now to FIG. 4A, an embodiment of a network environment is depicted. In brief overview, the network environment comprises one or more clients 102a-102n (also generally referred to as local machine(s) 102, client(s) 102, client node(s) 102, client machine(s) 102, client computer(s) 102, client device(s) 102, computing device(s) 102, endpoint(s) 102, or endpoint node(s) 102) in communication with one or more remote machines 106a-106n (also generally referred to as server(s) 106 or computing device(s) 106) via one or more networks 404.

Although FIG. 4A shows a network 404 between the client(s) 102 and the remote machines 106, the client(s) 102 and the remote machines 106 may be on the same network 404. The network 404 can be a local area network (LAN), such as a company Intranet, a metropolitan area network (MAN), or a wide area network (WAN), such as the Internet or the World Wide Web. In some embodiments, there are multiple networks 404 between the client(s) and the remote machines 106. In one of these embodiments, a network 404' (not shown) may be a private network and a network 404 may be a public network. In another of these embodiments, a network 404 may be a private network and a network 404' a public network. In still another embodiment, networks 404 and 404' may both be private networks. In yet another embodiment, networks 404 and 404' may both be public networks.

The network 404 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, an SDH (Synchronous Digital Hierarchy) network, a wireless network, and a wireline network. In some embodiments, the network 404 may comprise a wireless link, such as an infrared channel or satellite band. The topology of the network 404 may be a bus, star, or ring network topology. The network 404 may be of any such network topology as known to those ordinarily skilled in the art capable of supporting the operations described herein. The network 404 may comprise mobile telephone networks utilizing any protocol or protocols used to communicate among mobile devices (including tables and handheld devices generally), including AMPS, TDMA, CDMA, GSM, GPRS, UMTS, or LTE. In some embodiments, different types of data may be transmitted via different protocols. In other embodiments, the same types of data may be transmitted via different protocols.

A client(s) 102 and a remote machine 106 (referred to generally as computing devices 100) can be any workstation, desktop computer, laptop or notebook computer, server, portable computer, mobile telephone, mobile smartphone, or other portable telecommunication device, media playing device, a gaming system, mobile computing device, or any other type and/or form of computing, telecommunications or media device that is capable of communicating on any type and form of network and that has sufficient processor power and memory capacity to perform the operations described herein. A client(s) 102 may execute, operate or otherwise provide an application, which can be any type and/or form of software, program, or executable instructions, including, without limitation, any type and/or form of web browser, web-based client, client-server application, an ActiveX control, or a JAVA applet, or any other type and/or form of executable instructions capable of executing on client(s) 102.

In one embodiment, a computing device 106 provides functionality of a web server. In some embodiments, a web server 106 comprises an open-source web server, such as the NGINX web servers provided by NGINX, Inc., of San Francisco, Calif., or the APACHE servers maintained by the Apache Software Foundation of Delaware. In other embodiments, the web server executes proprietary software, such as the INTERNET INFORMATION SERVICES products provided by Microsoft Corporation of Redmond, Wash., the ORACLE IPLANET web server products provided by Oracle Corporation of Redwood Shores, Calif., or the BEA WEBLOGIC products provided by BEA Systems of Santa Clara, Calif.

In some embodiments, the system may include multiple, logically-grouped remote machines 106. In one of these embodiments, the logical group of remote machines may be referred to as a server farm 438. In another of these embodiments, the server farm 438 may be administered as a single entity.

FIGS. 4B and 4C depict block diagrams of a computing device 100 useful for practicing an embodiment of the client(s) 102 or a remote machine 106. As shown in FIGS. 4B and 4C, each computing device 100 includes a central processing unit 421, and a main memory unit 422. As shown in FIG. 4B, a computing device 100 may include a storage device 428, an installation device 416, a network interface 418, an I/O controller 423, display devices 424a-n, a keyboard 426, a pointing device 427, such as a mouse, and one or more other I/O devices 430a-n. The storage device 428 may include, without limitation, an operating system and software. As shown in FIG. 4C, each computing device 100 may also include additional optional elements, such as a memory port 403, a bridge 470, one or more input/output devices 430a-n (generally referred to using reference numeral 430), and a cache memory 440 in communication with the central processing unit 421.

The central processing unit 421 is any logic circuitry that responds to and processes instructions fetched from the main memory unit 422. In many embodiments, the central processing unit 421 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; those manufactured by International Business Machines of White Plains, N.Y.; or those manufactured by Advanced Micro Devices of Sunnyvale, Calif. Other examples include SPARC processors, ARM processors, processors used to build UNIX/LINUX "white" boxes, and processors for mobile devices. The computing device 400 may be based on any of these processors, or any other processor capable of operating as described herein.

Main memory unit 422 may be one or more memory chips capable of storing data and allowing any storage location to be directly accessed by the microprocessor 421. The main memory 422 may be based on any available memory chips capable of operating as described herein. In the embodiment shown in FIG. 4B, the processor 421 communicates with main memory 422 via a system bus 450. FIG. 4C depicts an embodiment of a computing device 400 in which the processor communicates directly with main memory 422 via a memory port 403. FIG. 4C also depicts an embodiment in which the main processor 321 communicates directly with cache memory 440 via a secondary bus, sometimes referred to as a backside bus. In other embodiments, the main processor 421 communicates with cache memory 440 using the system bus 450.

In the embodiment shown in FIG. 4B, the processor 421 communicates with various I/O devices 430 via a local system bus 450. Various buses may be used to connect the central processing unit 421 to any of the I/O devices 430, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 424, the processor 421 may use an Advanced Graphics Port (AGP) to communicate with the display 424. FIG. 4C depicts an embodiment of a computer 400 in which the main processor 421 also communicates directly with an I/O device 430b via, for example, HYPERTRANSPORT, RAPIDIO, or INFINIBAND communications technology.

One or more of a wide variety of I/O devices 430a-n may be present in or connected to the computing device 400, each of which may be of the same or different type and/or form. Input devices include keyboards, mice, trackpads, trackballs, microphones, scanners, cameras, and drawing tablets. Output devices include video displays, speakers, inkjet printers, laser printers, 3D printers, and dye-sublimation printers. The I/O devices may be controlled by an I/O controller 423 as shown in FIG. 4B. Furthermore, an I/O device may also provide storage and/or an installation medium 416 for the computing device 400. In some embodiments, the computing device 400 may provide USB connections (not shown) to receive handheld USB storage devices such as the USB Flash Drive line of devices manufactured by Twintech Industry, Inc. of Los Alamitos, Calif.

Referring still to FIG. 4B, the computing device 100 may support any suitable installation device 416, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive or any other device suitable for installing software and programs. In some embodiments, the computing device 400 may provide functionality for installing software over a network 404. The computing device 400 may further comprise a storage device, such as one or more hard disk drives or redundant arrays of independent disks, for storing an operating system and other software. Alternatively, the computing device 100 may rely on memory chips for storage instead of hard disks.

Furthermore, the computing device 400 may include a network interface 418 to interface to the network 404 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, 802.15.4, Bluetooth, ZIGBEE, CDMA, GSM, WiMax, and direct asynchronous connections). In one embodiment, the computing device 400 communicates with other computing devices 100' via any type and/or form of gateway or tunneling protocol such as Secure Socket Layer (SSL) or Transport Layer Security (TLS). The network interface 418 may comprise a built-in network adapter, network interface card, PCMCIA network card, card bus network adapter, wireless network adapter, USB network adapter, modem, or any other device suitable for interfacing the computing device 100 to any type of network capable of communication and performing the operations described herein.

In further embodiments, an I/O device 430 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 400 of the sort depicted in FIGS. 4B and 4C typically operates under the control of operating systems, which control scheduling of tasks and access to system resources. The computing device 400 can be running any operating system such as any of the versions of the MICROSOFT WINDOWS operating systems, the different releases of the UNIX and LINUX operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.1-4.0, WINDOWS CE, WINDOWS XP, WINDOWS 7, WINDOWS 8, WINDOWS VISTA, and WINDOWS 10, all of which are manufactured by Microsoft Corporation of Redmond, Wash.; any version of MAC OS manufactured by Apple Inc. of Cupertino, Calif.; OS/2 manufactured by International Business Machines of Armonk, N.Y.; Red Hat Enterprise Linux, a Linus-variant operating system distributed by Red Hat, Inc., of Raleigh, N.C.; Ubuntu, a freely-available operating system distributed by Canonical Ltd. of London, England; or any type and/or form of a Unix operating system, among others.

The computing device 400 can be any workstation, desktop computer, laptop or notebook computer, server, portable computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. In some embodiments, the computing device 100 may have different processors, operating systems, and input devices consistent with the device. In other embodiments, the computing device 400 is a mobile device, such as a JAVA-enabled cellular telephone/smartphone or personal digital assistant (PDA). The computing device 400 may be a mobile device such as those manufactured, by way of example and without limitation, by Apple Inc. of Cupertino, Calif.; Google/Motorola Div. of Ft. Worth, Tex.; Kyocera of Kyoto, Japan; Samsung Electronics Co., Ltd. of Seoul, Korea; Nokia of Finland; Hewlett-Packard Development Company, L.P. and/or Palm, Inc. of Sunnyvale, Calif.; Sony Ericsson Mobile Communications AB of Lund, Sweden; or Research In Motion Limited of Waterloo, Ontario, Canada. In yet other embodiments, the computing device wo is a smartphone, POCKET PC, POCKET PC PHONE, or other portable mobile device supporting Microsoft Windows Mobile Software.

In some embodiments, the computing device 400 is a digital audio player. In one of these embodiments, the computing device 400 is a digital audio player such as the Apple IPOD, IPOD TOUCH, IPOD NANO, and IPOD SHUFFLE lines of devices manufactured by Apple Inc. In another of these embodiments, the digital audio player may function as both a portable media player and as a mass storage device. In other embodiments, the computing device wo is a digital audio player such as those manufactured by, for example, and without limitation, Samsung Electronics America of Ridgefield Park, N.J., or Creative Technologies Ltd. of Singapore. In yet other embodiments, the computing device 400 is a portable media player or digital audio player supporting file formats including, but not limited to, MP3, WAV, M4A/AAC, WMA Protected AAC, AEFF, Audible audiobook, Apple Lossless audio file formats, and .mov, .mov, and .mp4 MPEG-4 (H.264/MPEG-4 AVC) video file formats.

In some embodiments, the computing device 400 comprises a combination of devices, such as a mobile phone combined with a digital audio player or portable media player. In one of these embodiments, the computing device 100 is a device in the Google/Motorola line of combination digital audio players and mobile phones. In another of these embodiments, the computing device 400 is a device in the IPHONE smartphone line of devices manufactured by Apple Inc. In still another of these embodiments, the computing device 400 is a device executing the ANDROID open source mobile phone platform distributed by the Open Handset Alliance; for example, the device wo may be a device such as those provided by Samsung Electronics of Seoul, Korea, or HTC Headquarters of Taiwan, R.O.C. In other embodiments, the computing device 400 is a tablet device such as, for example and without limitation, the IPAD line of devices manufactured by Apple Inc.; the PLAYBOOK manufactured by Research In Motion; the CRUZ line of devices manufactured by Velocity Micro, Inc. of Richmond, Va.; the FOLIO and THRIVE line of devices manufactured by Toshiba America Information Systems, Inc. of Irvine, Calif.; the GALAXY line of devices manufactured by Samsung; the HP SLATE line of devices manufactured by Hewlett-Packard; and the STREAK line of devices manufactured by Dell, Inc. of Round Rock, Tex.

Having described certain embodiments of methods and systems for protecting user-generated data in computer network traffic from analysis, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method for synchronizing, in a browser state of a web browser application, automatically-generated content and user-generated content to statistically poison analytics of computer network traffic including data associated with the synchronized browser state, the method comprising:

retrieving, by a controller application executing on a first computing device, from a profile database, profile content;

receiving, by a first browser application executing on the first computing device, from the controller application, a first request including automatically-generated content based on the retrieved profile content;

transmitting, by the first browser application, a first network request, the network request including the automatically-generated content;

synchronizing, by a second browser application executing on the first computing device, a browser state of the second browser application with a browser state of the first browser application;

receiving, by the second browser application, a second request including user-generated content; and transmitting, by the second browser application, a second network request including the user-generated content and data from the synchronized browser state.

2. The method of claim 1, wherein receiving the first request further comprises receiving a Domain Name Service lookup request.

3. The method of claim 1, wherein transmitting the first network request further comprises transmitting, to a search engine, the first network request.

4. The method of claim 1, wherein receiving the second request further comprises receiving a Domain Name Service lookup request.

5. The method of claim 1, wherein transmitting the second network request further comprises transmitting, to a search engine, the second network request including the user-generated content and data from the synchronized browser state.

6. A non-transitory computer-readable medium comprising computer-readable instructions tangibly stored on the non-transitory computer-readable medium, wherein the instructions are executable by at least one processor to perform a method for synchronizing, in a browser state of a web browser application, automatically-generated content and user-generated content to statistically poison analytics of computer network traffic including data associated with the synchronized browser state, the method comprising:

retrieving, by a controller application executing on a first computing device, from a profile database, profile content;

receiving, by a first browser application executing on the first computing device, from the controller application, a first request including automatically-generated content based on the retrieved profile content;

transmitting, by the first browser application, a first network request, the network request including the automatically-generated content;

synchronizing, by a second browser application executing on the first computing device, a browser state of the second browser application with a browser state of the first browser application;

receiving, by the second browser application, a second request including user-generated content; and transmitting, by the second browser application, a second network request including the user-generated content and data from the synchronized browser state.

7. The non-transitory computer-readable medium of claim 6, wherein receiving the first request further comprises receiving a Domain Name Service lookup request.

8. The non-transitory computer-readable medium of claim 6, wherein transmitting the first network request further comprises transmitting, to a search engine, the first network request.

9. The non-transitory computer-readable medium of claim 6, wherein receiving the second request further comprises receiving a Domain Name Service lookup request.

10. The non-transitory computer-readable medium of claim 6, wherein transmitting the second network request further comprises transmitting, to a search engine, the second network request including the user-generated content and data from the synchronized browser state.

\* \* \* \* \*

UNITED STATES PATENT AND TRADEMARK OFFICE
CERTIFICATE OF CORRECTION

| | |
|---|---|
| PATENT NO. | : 11,003,732 B2 |
| APPLICATION NO. | : 16/013222 |
| DATED | : May 11, 2021 |
| INVENTOR(S) | : Tseng |

It is certified that error appears in the above-identified patent and that said Letters Patent is hereby corrected as shown below:

In the Drawings

In Sheet 13 of 13, FIG. 4C, for Tag "430a-n" delete "I/O Device" and insert -- I/O Devices --, therefor.

In the Specification

In Column 6, Line 7, delete "Locations" and insert -- Locators --, therefor.

In Column 6, Line 65, delete "PlusVerhs:" and insert -- PlusVerbs: --, therefor.

In Column 7, Line 34, delete "Camivory," and insert -- Carnivory, --, therefor.

In Column 7, Line 50, delete "loves," and insert -- lowes, --, therefor.

In Column 7, Line 56, delete "Drosera capensis," and insert -- Drosera Capensis, --, therefor.

In Column 7, Line 65, delete "Drosera albansis," and insert -- Drosera Albansis, --, therefor.

In Column 10, Line 37, delete "116b" and insert -- 110b --, therefor.

In Column 10, Line 60, delete "110a" and insert -- 110b --, therefor.

In Column 10, Line 63, delete "116b" and insert -- 110b --, therefor.

In Column 15, Line 63, delete "espionage;" and insert -- espionage); --, therefor.

In Column 21, Line 36, delete "Schaumburg, Ill.;" and insert -- Schaumburg, IL; --, therefor.

In Column 21, Line 49, delete "memory 422" and insert -- memory unit 422 --, therefor.
In Column 21, Line 52, delete "memory 422" and insert -- memory unit 422 --, therefor.

Signed and Sealed this
Ninth Day of May, 2023

Katherine Kelly Vidal
*Director of the United States Patent and Trademark Office*

CERTIFICATE OF CORRECTION (continued)
U.S. Pat. No. 11,003,732 B2

In Column 21, Line 54, delete "memory 422" and insert -- memory unit 422 --, therefor.

In Column 22, Line 1, delete "display 424" and insert -- display device 424 --, therefor.

In Column 22, Line 3, delete "display 424" and insert -- display device 424 --, therefor.

In Column 22, Line 41, delete "56 kb," and insert -- 56kb, --, therefor.

In Column 23, Line 53, delete "device wo" and insert -- device 100 --, therefor.

In Column 23, Lines 64-65, delete "device wo" and insert -- device 400 --, therefor.

In Column 24, Line 6, delete "and .mov, .mov, and .mp4" and insert -- .mov, .m4v, and .mp4 --, therefor.

In Column 24, Line 20, delete "device wo" and insert -- device 400 --, therefor.